United States Patent
Tomihisa

(10) Patent No.: US 11,132,154 B2
(45) Date of Patent: Sep. 28, 2021

(54) IMAGE PROCESSING SYSTEM TO SUPPORT PRINTING BY USERS OF CHAT APPLICATIONS AND CONTROL METHOD THEREOF

(71) Applicant: CANON KABUSHIKI KAISHA, Tokyo (JP)

(72) Inventor: Taishi Tomihisa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/988,925

(22) Filed: Aug. 10, 2020

(65) Prior Publication Data

US 2021/0055897 A1 Feb. 25, 2021

(30) Foreign Application Priority Data

Aug. 19, 2019 (JP) .............................. JP2019-149921

(51) Int. Cl.
| | | |
|---|---|---|
| *G06F 15/00* | (2006.01) | |
| *G06F 3/12* | (2006.01) | |
| *G06K 1/00* | (2006.01) | |
| *H04L 12/58* | (2006.01) | |

(52) U.S. Cl.
CPC ............ *G06F 3/1232* (2013.01); *G06F 3/126* (2013.01); *G06F 3/1207* (2013.01); *G06F 3/1292* (2013.01); *H04L 51/02* (2013.01)

(58) Field of Classification Search
CPC ...... G06F 3/1232; G06F 3/1207; G06F 3/126; G06F 3/1292; H04L 51/02

USPC ............................... 358/1.15, 1.13, 1.14, 1.1
See application file for complete search history.

(56) References Cited

U.S. PATENT DOCUMENTS

| | | | |
|---|---|---|---|
| 2011/0063668 A1 | 3/2011 | Shirai | |
| 2018/0375998 A1* | 12/2018 | Beilis | ...................... H04L 51/02 |
| 2020/0304437 A1* | 9/2020 | Sasamae | ................. H04L 51/26 |
| 2020/0344375 A1* | 10/2020 | Ishii | ...................... G06F 3/1205 |

FOREIGN PATENT DOCUMENTS

JP 2011065368 A 3/2011

* cited by examiner

*Primary Examiner* — Douglas Q Tran
(74) *Attorney, Agent, or Firm* — Venable LLP

(57) ABSTRACT

An image processing system includes a chat application service, a server, and image processing apparatuses. The server comprises a memory storing instructions; and a processor that executes the instructions, the instructions causing the server to perform operations comprising: storing user information and information of an image processing apparatus, and providing a chat bot function for supporting an operation by a user, wherein the supporting of the operation includes, in a case where an image processing request is accepted via a chat screen of the chat application service, processing to specify an image processing apparatus which can be used by a user who made the image processing request from the plurality of image processing apparatuses, and to present information of the specified image processing apparatus via the chat screen.

12 Claims, 19 Drawing Sheets

FIG. 5A

| Chat UserName | MFP Information | MFP UserName | Print Setting | Scan Setting | Current Location |
|---|---|---|---|---|---|
| User-A | MFP-A1 | AAA111 | 1 UNIT, COLOR, SINGLE-SIDED | AUTOMATIC FILE NAME, OCR | Tokyo |
| User-B | MFP-B1 | BBB222 | 1UNIT, BLACK AND WHITE, DOUBLE-SIDED | FILE NAME [AAA.pdf] | Osaka |
| User-C | MFP-B1 | CCC333 | 1 UNIT, COLOR, SINGLE-SIDED | AUTOMATIC FILE NAME, OCR | Tokyo |
| User-D | MFP-A2 | DDD444 | 1UNIT, BLACK AND WHITE, DOUBLE-SIDED | AUTOMATIC FILE NAME, OCR | Tokyo |
| ... | ... | ... | ... | ... | ... |

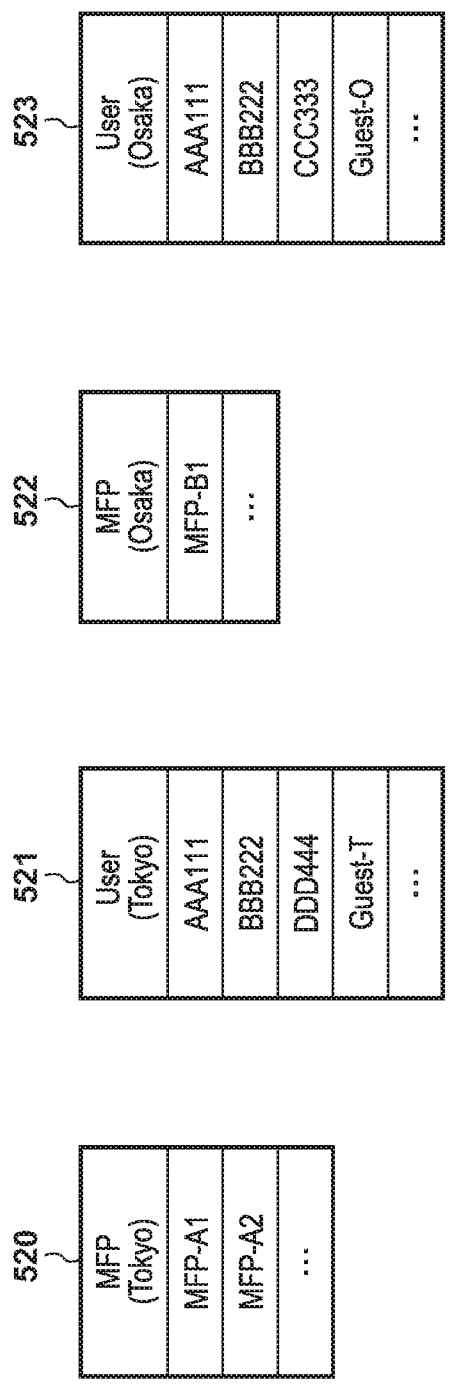

FIG. 5B

| MFP (Tokyo) |
|---|
| MFP-A1 |
| MFP-A2 |
| ... |

FIG. 5C

| User (Tokyo) | |
|---|---|
| AAA111 | |
| BBB222 | |
| DDD444 | |
| Guest-T | |

FIG. 5D

| MFP (Osaka) |
|---|
| MFP-B1 |
| ... |

FIG. 5E

| User (Osaka) | |
|---|---|
| AAA111 | |
| BBB222 | |
| CCC333 | |
| Guest-O | |

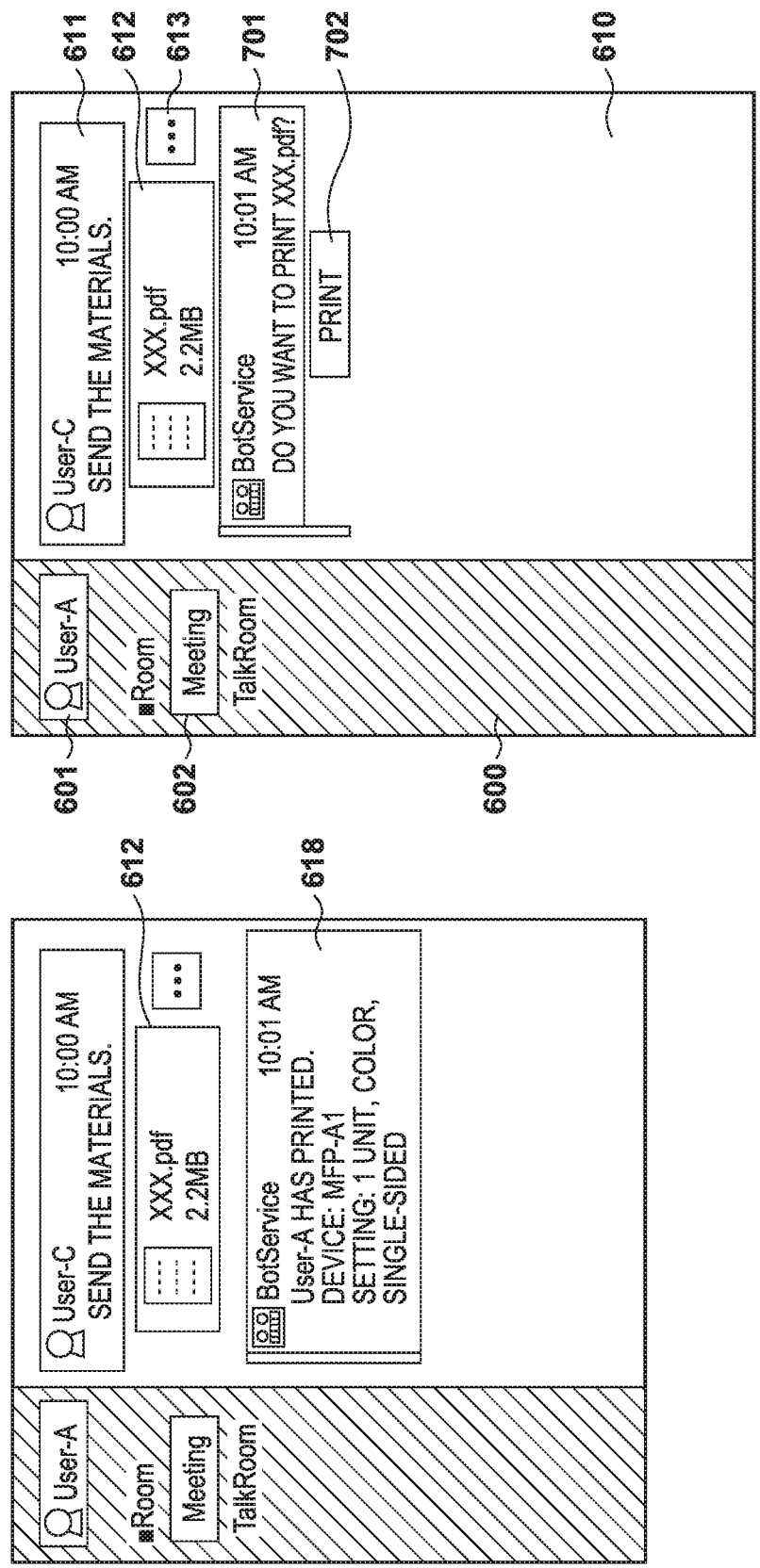

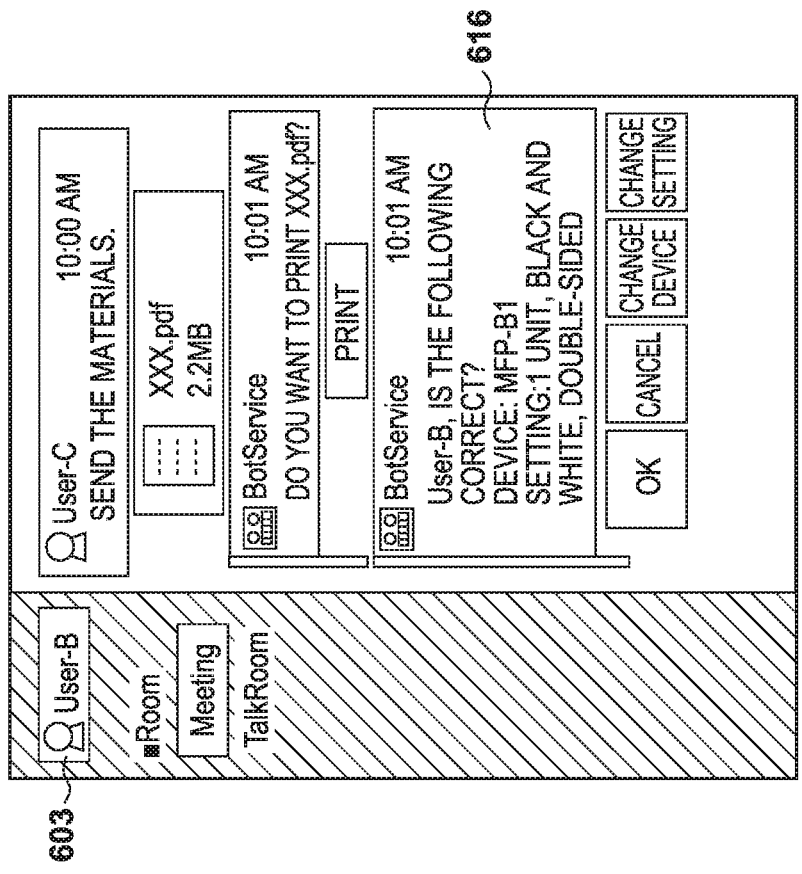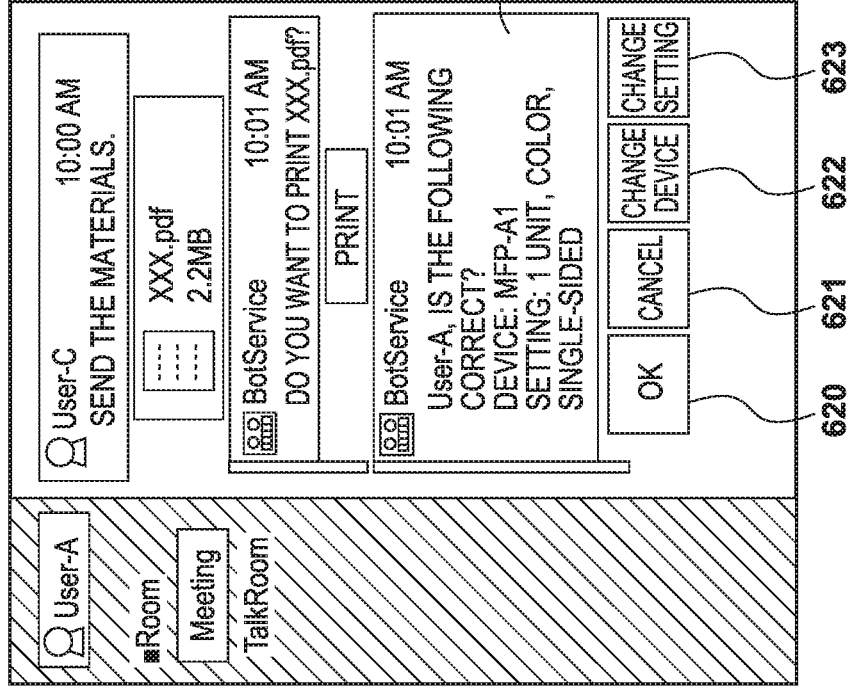

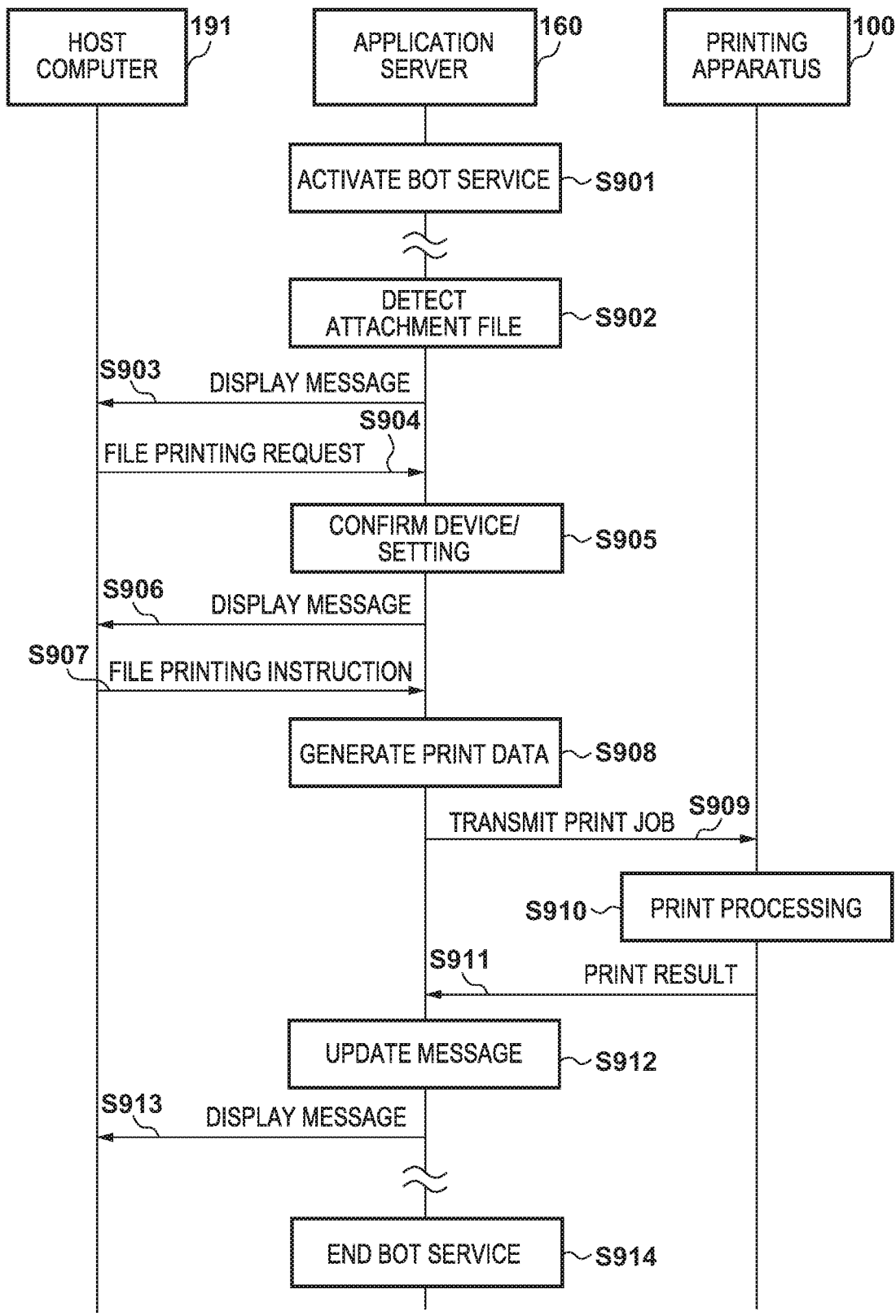

IMAGE PROCESSING SYSTEM TO SUPPORT PRINTING BY USERS OF CHAT APPLICATIONS AND CONTROL METHOD THEREOF

BACKGROUND OF THE INVENTION

Field of the Invention

The present invention relates to an image processing system and a control method thereof.

Description of the Related Art

In recent years, work is increasingly being performed remotely or regardless of location by using a cloud platform to connect information processing apparatuses such as a personal computer, a mobile phone, and the like to a network. In such a work environment, a chat application is used as a communication means that has high immediacy, and a chatbot that responds to a user's message or the like and assists the user's operation on the chat application is known.

On the other hand, there is disclosed a technique (for example, Japanese Patent Laid-Open No. 2011-65368) for selecting, based on the location and the print settings designated by a user, an image forming apparatus which has been registered in the past as an output destination so printing can be performed smoothly in a case in which the location of an information processing apparatus cannot be specified.

In a work environment, tasks that use a multi-function peripheral device, for example, printing of materials, scanning and digitizing of paper materials for the purpose of sharing the paper materials in a group, and the like are performed. A chat channel used in such a work environment needs to be able to assist a print function and a scan function which are used in close cooperation with such work.

On the other hand, in a chat application used in a work environment, communication within a single chat may be performed by users in a plurality of locations or different organizations. In such a case, the image forming apparatuses to be used for input and output may differ for each user. In addition, as people's work styles have diversified, people are working in coworking spaces, at home, and the like. Hence, even in a case in which the same user is to print a document from a chat or transmit scanned data to a chat, the image forming apparatus to be used will change in each occasion.

Japanese Patent Laid-Open No. 2011-65368 discloses a technique that automatically determines, in an on-premise printing system using a printer driver and a printer server, a printer to be used as an output destination among the printers which have been used by a specific user in the past. However, it is assumed that a printer driver that has been individually installed in each terminal will be used in the on-premise printing system. Therefore, Japanese Patent Laid-Open No. 2011-65368 does not consider a mechanism for selecting a suitable image processing apparatus corresponding to the user who has instructed a printing operation in cases such as printing performed via chat by a user who belongs to a different organization, printing performed via chat from various locations, and the like.

SUMMARY OF THE INVENTION

The present invention provides a mechanism that allows a suitable image processing apparatus to be used in correspondence with each user in a case in which image processing is to be performed via chat.

The present invention includes the following arrangement. That is, an image processing system that includes a chat application service, a server, and a plurality of image processing apparatuses which are used by a plurality of users, the server comprising: at least one memory that stores a set of instructions; and at least one processor that executes the instructions, the instructions, when executed, causing the server to perform operations comprising: storing user information and information of an image processing apparatus in a predetermined storage area, and providing, as a bot of the chat application service, a chat bot function for supporting an operation by a user, wherein the supporting of the operation includes, in a case in which an image processing request is accepted via a chat screen of the chat application service, processing to specify, based on the information stored in the predetermined storage area, an image processing apparatus which can be used by a user who made the image processing request from the plurality of image processing apparatuses, and to present information of the specified image processing apparatus via the chat screen is provided.

In addition, according to another aspect of the present invention, a control method for presenting, to a user using a chat application service which is executed by using a cloud platform including the chat application service, a chat bot, a cloud printing service, and a management service for managing user information, a cloud printer which can be used by the user, is provided, wherein in a case in which a chat bot participating in a chat presented by the chat application service accepts, via the chat, a user operation indicating a printing request, the chat bot transmits, to the cloud printing service, a request including information for identifying a user who made the user operation and inquiring about a cloud printer which can be used by the user, in response to accepting the request, the cloud printing service specifies, based on the information for identifying the user included in the request, a tenant of the user who made the printing request to the management service, and notifies the chat bot of a list of the cloud printers which can be used by the user belonging to the specified tenant, and the chat bot further presents, based on the notified list of the cloud printers, a cloud printer which can be used by the user who made the user operation indicating the printing request on the chat.

According to this present invention, a suitable image processing apparatus that corresponds to each user can be used in a case in which image processing is to be performed via chat.

Further features of the present invention will become apparent from the following description of exemplary embodiments with reference to the attached drawings.

BRIEF DESCRIPTION OF THE DRAWINGS

FIGS. 5A, 5B, 5C, 5D, and 5E are tables showing examples of setting files of a bot service according to the first embodiment;

FIGS. 6A, 6B, 6C, 6D, and 6E are views showing examples of a display screen of a chat application according to the first embodiment;

FIGS. 7A, 7B, 7C, 7D, and 7E are views showing examples of a display screen of a chat application according to the second embodiment;

FIG. 9 is a sequence chart showing a series of processing procedures according to the second embodiment;

DESCRIPTION OF THE EMBODIMENTS

Figure 1:
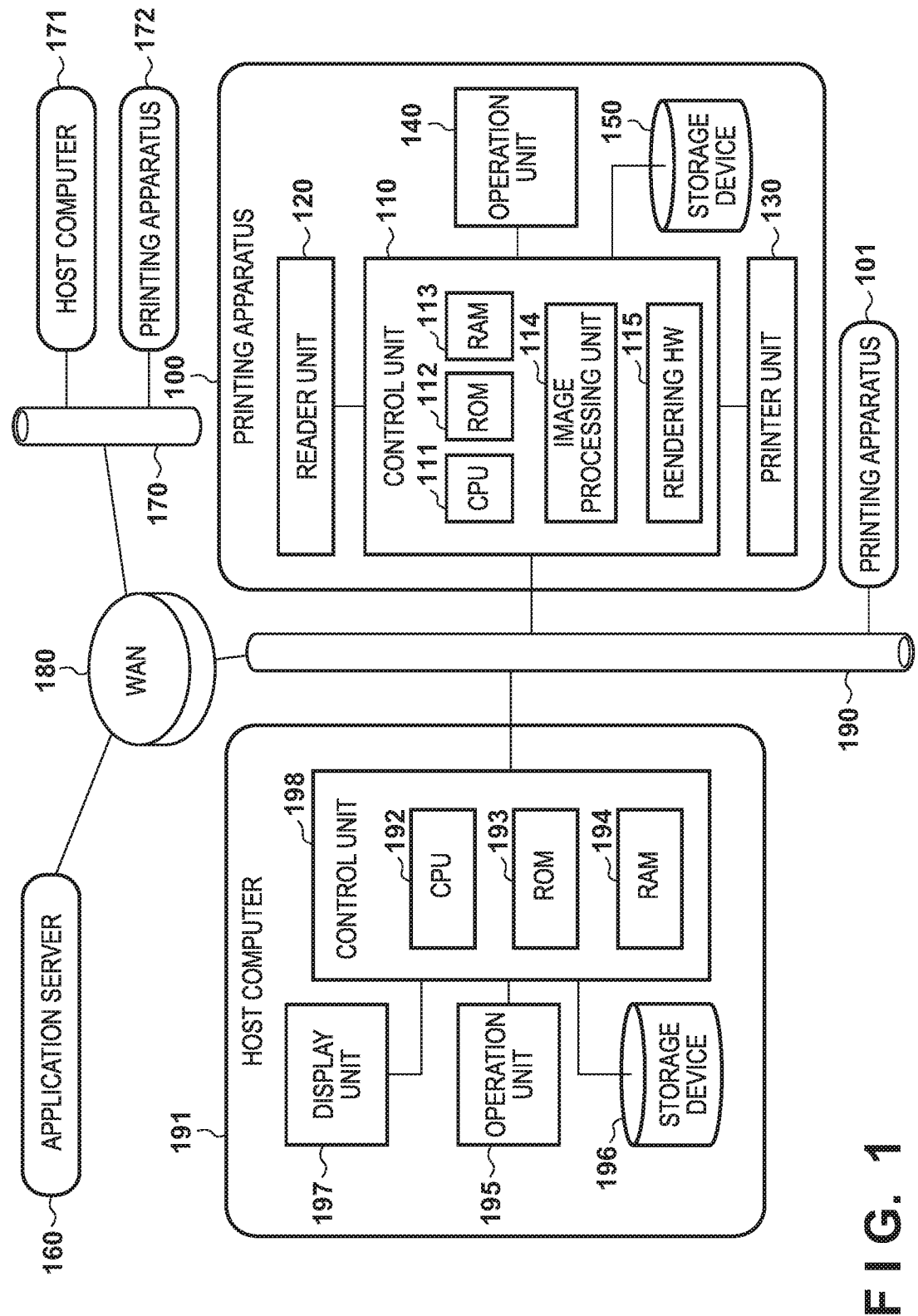
FIG. 1 is a view showing an example of the arrangement of a system according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

[System Outline]

FIG. 1 is a view showing an example of the arrangement of an image processing system according to an embodiment of the present invention. In FIG. 1, an application server 160, host computers 191 and 171, and printing apparatuses 100, 101, and 172 are communicably connected to each other via a WAN (Wide Area Network) 180 as an example of a network.

In this embodiment, an MFP (Multi-Function Peripheral device) integrating a plurality of functions such as a printing function, a reading function, a FAX function, and the like is exemplified as the printing apparatus 100. However, a printer of another arrangement such as an SFP (Single-Function Printer), an LBP (Laser Beam Printer), or the like may be used as an image processing apparatus that corresponds to the printing apparatus 100. The printing apparatus 100, the printing apparatus 101, and the host computer 191 are communicably connected to each other via a network 190 such as a LAN (Local Area Network) or the like.

As shown in FIG. 1, a plurality of printing apparatuses and host computers may be connected to the same LAN, and other apparatuses such as a server and the like may also be connected to the same LAN. Also, each network may be a wired network, a wireless network, or an arrangement obtained by combining wired and wireless networks. Since the host computer 171, the printing apparatus 172, and a network 170 that are provided in a different location are arranged in a similar manner, a description will be omitted.

The printing apparatus 100 includes a control unit 110, a reader unit 120, a printer unit 130, an operation unit 140, and a storage device 150. The control unit 110 is a control substrate (controller) that integrally controls the printing apparatus 100. The control unit 110 includes a CPU (Central Processing Unit) 111, a ROM (Read Only Memory) 112, and a RAM (Random Access Memory) 113. In addition, the control unit 110 also includes an image processing unit 114 and rendering HW 115. The CPU 111 controls each block in the control unit 110 via a system bus (not shown). For example, the CPU 111 can read out and execute programs stored in the ROM 112, the RAM 113, the storage device 150, or another storage medium to execute various kinds of functions of the printing apparatus 100. The ROM 112 is a non-volatile storage area and stores, for example, control programs, tables and setting data required to execute the functions of the printing apparatus 100, and the like. The RAM 113 is a volatile storage area and is used as, for example, a work memory of the CPU 111.

The image processing unit 114 executes various kinds of image processing operations such as conversion, correction, editing, compression/decompression, and the like on scanned image data generated by the reader unit 120 or on image data received from the outside. The image processing unit 114 may be formed by hardware or may be implemented by software. The rendering HW 115 is hardware that generates a rendered image at high speed based on intermediate data. The storage device 150 stores, for example, image data, device information such as the mode, the license, and the like, and user information such as an address book, customized settings, and the like. The reader unit 120 includes scanner engine components and generates scanned image data by optically reading an original set on an original table (not shown) or an original fed from an ADF (Automatic Document Feeder). The printer unit 130 includes printer engine components corresponding to various kinds of printing methods such as the inkjet printing method, electrophotography method, and the like, and forms an image on a print medium such as a paper sheet or the like. The operation unit 140 includes operation keys for accepting an operation by a user and a liquid crystal panel for making various kinds of settings and displaying a user interface screen, and outputs information accepted from a user operation or the like to the control unit 110.

The printing apparatus 100 is not limited to the components shown in FIG. 1 and also includes other components in accordance with the executable functions of the printing apparatus 100. For example, the printing apparatus may also include components required for executing the facsimile function and components which will enable short-range wireless communication. Although the printing apparatus 100 has been described as an example here, a description of the arrangement of the printing apparatuses 101 and 172 will be omitted by assuming that these printing apparatus also have a similar arrangement. In addition, it may be arranged so that information related to the printing apparatuses will be aggregated by setting, as an intermediary, a print server (not shown) that can manage printing apparatuses which are connected to the same LAN or printing apparatuses which can be commonly used via a WAN.

The host computer 191 is an information processing apparatus and includes a control unit 198, an operation unit 195, a storage device 196, and a display unit 197. The control unit 198 is a control substrate (controller) that integrally controls the host computer 191. The control unit 198 includes a CPU 192, a ROM 193, and a RAM 194. The CPU 192 controls each block in the control unit 198 via a system bus (not shown). For example, the CPU 192 can read out and execute programs stored in the ROM 193, the RAM 194, the storage device 196, or another storage medium to execute various kinds of functions of the host computer 191. The ROM 193 is a non-volatile storage area and stores, for example, various kinds of control programs such as an operating system program (OS) and the like, tables and setting data required to execute the functions of the host computer 191, and the like. The RAM 194 is a volatile storage area and is used as, for example, a work memory of the CPU 192. The storage device 196 is a non-volatile storage area and stores, for example, various kinds of application programs, data, user information, device information, and the like.

The operation unit 195 includes a keyboard, a pointing device, and the like for accepting the operation by the user, and outputs information accepted from the user operation and the like to the control unit 198. The display unit 197 is, for example, a liquid crystal display and displays various kinds of information and user interface (UI) screens. Although the host computer 191 has been described as an example here, a description of the arrangement of the host computer 171 will be omitted by assuming that it also has a similar arrangement.

An arrangement similar to the arrangement of the host computer 191 can be applied as the internal arrangement of the application server 160, and a detailed description will be omitted here. Various kinds of services such as a chat application service, a bot service, a position information management service, a data storage service, and the like can be operated on the application server 160. In this embodiment, assume that a chat application service is a web application that operates on a web browser (not shown) provided in the host computer 191. Note that the type of the web browser is not particularly limited in this case.

Note that it is also possible to adopt a mode in which a chat application service on the side of the application server 160 provides required data upon receiving a chat-dedicated client application operating on the host computer 191. Hence, the chat application is not particularly limited as long as the arrangement according to this embodiment can be applied. Note that these services may operate on different servers as long as they are in a communicable state via a network such as the WAN 180 or the like. More specific embodiments will be described hereinafter based on the example of a system having an arrangement as described above.

First Embodiment

[Processing Sequence]

Figure 2:
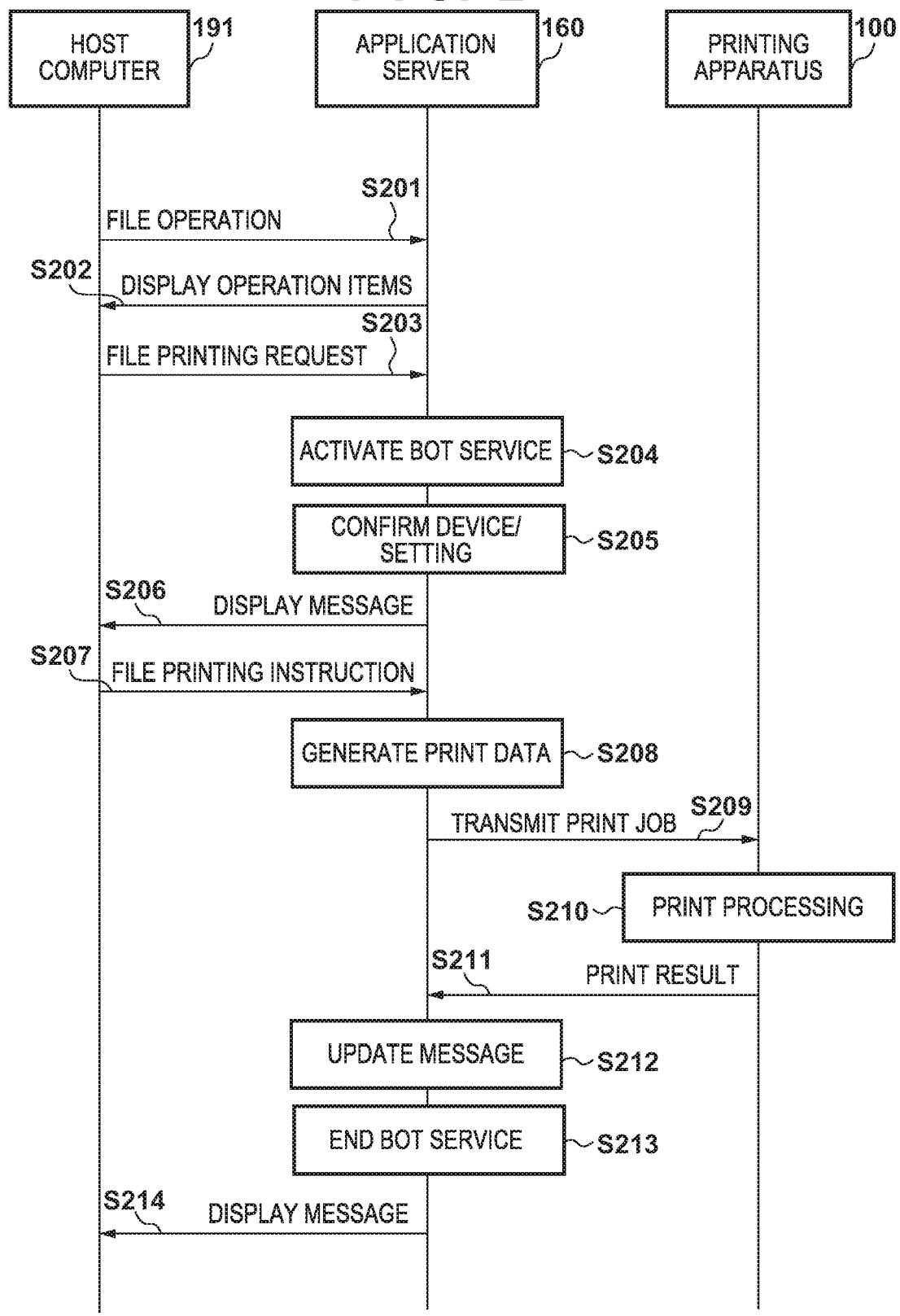
FIG. 2 is a sequence chart showing a series of processing procedures according to the first embodiment.

FIG. 2 is a sequence chart showing the processing procedures of the host computer 191, the application server 160, and the printing apparatus 100 according to the first embodiment of the present invention. In this embodiment, assume that the cooperation between the application server 160 and the host computer 191 will be performed via a chat application (to be referred to as a chat app hereinafter). Note that although not shown in FIG. 2, assume that that the other host computer and printing apparatuses can also operate in a similar manner.

In S201, the host computer 191 accepts a predetermined file operation from a user via a screen (to be referred to as a chat screen hereinafter) provided by the chat app, and transmits the operation contents to the application server 160. The chat screen display examples will be described later with reference to FIGS. 6A to 6E.

In S202, the application server 160 displays, based on the operation contents received in S201, corresponding operation items on the chat screen.

In S203, the host computer 191 displays a chat screen including the operation contents based on an input from the application server 160. Subsequently, in response to accepting a file printing request from the user on the chat screen, the host computer 191 transmits the file printing request to the application server 160.

In S204, the application server 160 activates a bot service to support the file printing operation. This activation may be performed by executing a program corresponding to a bot service that provides a chat bot function.

In S205, the application server 160 confirms the printing apparatus that can be used for file printing and the settings of this apparatus.

In S206, based on the result of the confirmation processing performed in S205, the application server 160 displays a message from the bot service (chat bot) on the chat screen.

In step S207, the host computer 191 displays a chat screen based on the message received from the application server 160. Subsequently, in response to accepting a file printing instruction from the user on the chat screen, the host computer 191 transmits the file printing instruction to the application server 160.

In S208, the application server 160 generates print data based on the file printing instruction received from the host computer 191.

In S209, the application server 160 transmits a print job including the generated print data to the printing apparatus 100 which was designated in the file printing instruction.

In S210, the printing apparatus 100 performs print processing by using the print job received from the application server 160.

In S211, the printing apparatus 100 transmits the result of the print processing executed in step S210 to the application server 160.

In S212, the application server 160 updates the message which is to be displayed on the chat screen from the bot service.

In S213, the application server 160 ends the activated bot service.

In S214, the application server 160 displays the message updated in S212 on the chat screen. Subsequently, the processing sequence ends.

(Processing by Application Server)

Figure 3:
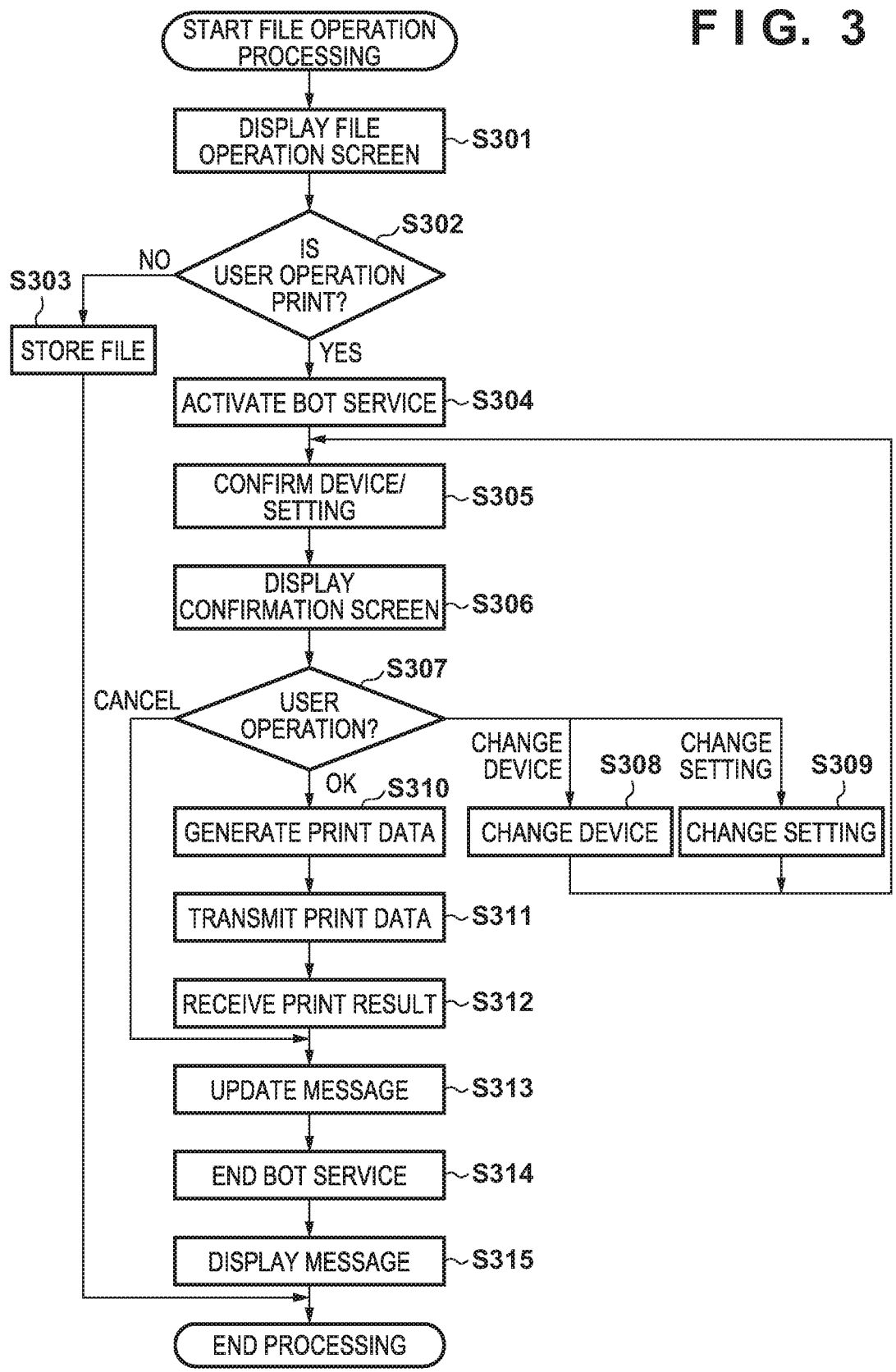
FIG. 3 is a flowchart of file operation processing according to the first embodiment.

FIG. 3 is a flowchart showing the processing of the application server 160 according to this embodiment. This processing focuses on the processing procedure performed by the application server 160 among the processing procedures described in the processing sequence shown in FIG. 2. The processing of FIG. 3 is implemented by the CPU of the application server 160 reading out, to the RAM, a program stored in the ROM and executing the program. In this embodiment, the processing of FIG. 3 is started when the user selects an attachment file on a display screen of a chat app on the web browser of the host computer 191. FIGS. 6A to 6E show chat screen arrangement examples of the chat app according to this embodiment. The processing procedure will be described along with the transition of the screen hereinafter.

In step S301, the application server 160 generates data of a file operation screen of the file selected by the user on the chat screen, and transmits the generated data to the host computer 191. As a result, the file operation screen is displayed on the display unit 197 of the host computer 191.

Figure 6A:
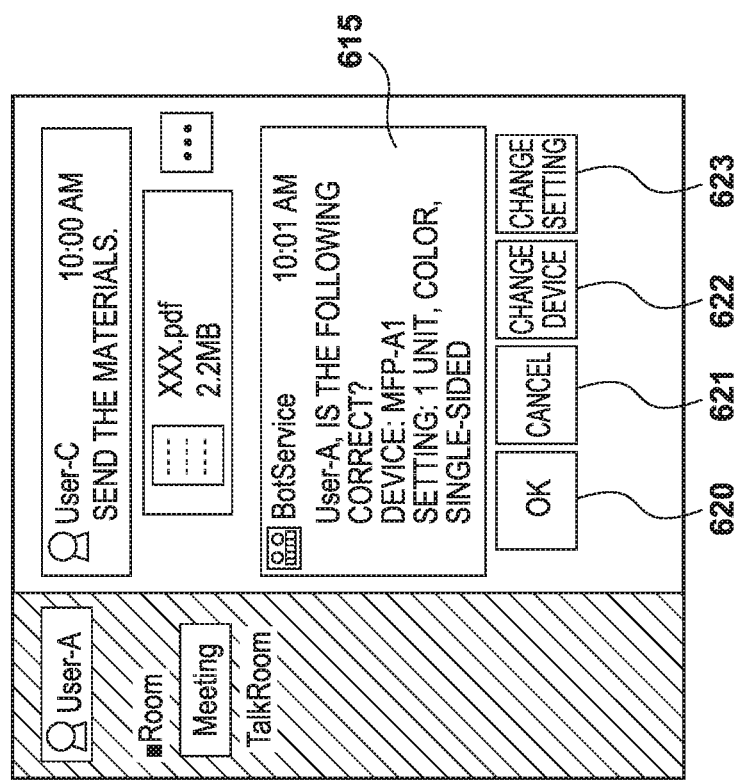

FIG. 6A shows an example of the arrangement of a chat screen. The chat screen according to this embodiment includes a base display region 600 and a room display region 610. A username 601 and a room name 602 are displayed in the base display region 600. The username 601 displays a username ("User-A" in the example of FIG. 6A) logged in to the chat app and its user icon.

The room name 602 displays a list of one or a plurality of chat rooms which are accessible from this chat app, and a selected room ("Meeting" in the example of FIG. 6A) has been emphasized and displayed. A room display region 610 is a region where a message input in (posted on) the room selected on the room name 602 is displayed. More specifically, a message 611 and an attachment file 612 have been posted by a given user (a user whose username is "User-C" in this case), and this message and this attachment file have been displayed. Furthermore, a file operation button 613 has been displayed in association with the message 611 and the attachment file 612. When an operation to select the file operation button 613 is accepted from the user, a file operation screen 614 including options "Download" and "Print" are displayed. Note that although two items have been exemplified here as items to be displayed on the file operation screen 614, the items are not limited to these, and it may be set so that other file operations can be selected. The selection operation of the file operation button 613 performed here corresponds to S201 of FIG. 2. Also, the display of the file operation screen 614 in response to this selection operation corresponds to S202 of FIG. 2.

In S302, the application server 160 accepts an operation from the user via the operation unit 195 of the host computer 191. The application server 160 determines whether the accepted operation is "Print" of the file operation screen 614. If it is determined that "Print" has been selected (YES in step S302), the process advances to step S304. If it is determined that "Download" has been selected (NO in step S302), the process advances to step S303. The acceptance of the "Print" instruction here corresponds to the reception of the file printing request in S203 of FIG. 2.

In step S303, the application server 160 transmits the copy data of the file selected by the user to the host computer 191 via the WAN 180. As a result, the selection of "Download" causes the file selected by the user to be downloaded to the host computer 191, and the file is stored in an arbitrary storage area. Note that the process of this step is omitted in FIG. 2. Subsequently, this processing procedure ends.

In step S304, the application server 160 activates the bot service that assists the execution of printing. Furthermore, the application server 160 loads setting files held in the RAM 194 and the storage device 196 and sets the initial settings of the bot service. This process corresponds to the process of S204 in FIG. 2.

FIG. 5A shows an example of the user information held as a setting file of the bot service. In a setting file according to this embodiment, a username 500 (user account) used in the chat app and a series of information related to the user are associated and managed. Four records 510 to 513 have been exemplified in this case. Also, MFP information 501, an MFP username 502, print settings 503, scan settings 504, and current position information 505 are included as information associated with the username 500.

The MFP information 501 is the information of the MFP to which each user has been registered as a user. The MFP username 502 is the username (user account) used on the registered MFP. The MFP username 502 may include authentication information (not shown) required when the MFP is to be used. The print settings 503 and the scan settings 504 are settings (only an excerpt is shown in each of the settings) used when the MFP indicated by the MFP information 501 is to perform printing and scanning. In the current position information 505, a value obtained by inquiring to a position information management service (not shown) is set as the current position information of the user. In this case, the position information management service may specify the position information based on the GPS (Global Positioning System) information of the information processing terminal held by the user, the network information of the network to which the user's information processing terminal is connected, room entry management information from an ID card, or the like. The position information may be information associated with the user or may be information associated with the information processing apparatus used by the user.

FIGS. 5B and 5C show examples of MFP information 520 and MFP user information 521 which correspond to the network 190 and are managed as setting files of the bot service. In a similar manner, FIGS. 5D and 5E show examples of MFP information 522 and MFP user information 523 which correspond to the network 170 and are managed as setting files of the bot service. That is, in this embodiment, the information related to the MFP is managed for each connected network (for example, each site or group). Note that although this embodiment has an arrangement in which the bot service holds and manages each setting file, the present invention is not limited to this. For example, an apparatus such as a print server (not shown) or the like on each network may manage the various kinds of information, and the bot service may obtain the various kinds of information by making an inquiry to this apparatus.

In step S305, based on the username 500 obtained by the user operation in step S302 and the current position information 505 set in step S304, the application server 160 selects an MFP from the plurality of MFPs which it is managing. Subsequently, the application server 160 makes an inquiry to the selected MFP about whether the print settings 503 associated with the username 500 can be used.

For example, if the username 500 ("User-A") of the record 510 has been set, the MFP information 520 of FIG. 5B and the MFP user information 521 of FIG. 5C are obtained based on the current position information 505. Since the MFP information 501 ("MFP-A1") and the MFP username 502 ("AAA111") corresponding to the record 510 are included in the obtained information, "MFP-A1" set in the MFP information 501 is selected. In a similar manner, if the username 500 ("User-B") of the record 511 has been set, "MFP-B1" is selected. In this manner, a suitable MFP is selected in accordance with the position of each user.

On the other hand, if the username 500 ("User-C") of the record 512 has been set, the MFP information 520 of FIG. 5B and the MFP user information 521 of FIG. 5C are selected based on the current position information 505 ("Tokyo"). Since the MFP information 501 ("MFP-B1") and the MFP username 502 ("CCC333") corresponding to the record 512 are not included in the obtained information, an MFP cannot be selected. In this case, "MFP-A1" used by the user "User-A" of the same chat group (or the room "Meeting" in the example of FIG. 6A) will be presented as a candidate MFP. Furthermore, Since the user "User-C" does not have a user account registered in "MFP-A1", the user "User-C" will be handled as "Guest-T" who is a temporary user. As a result, a user will be able to smoothly use a printing apparatus in the vicinity of the user by utilizing the communication information of the chat. Note that a temporary user ("Guest-T" and "Guest-O") is registered beforehand in each of the MFP user information 521 and the MFP user information 523.

Note that in a case in which there are a plurality of usable MFPs, a priority can be set to determine, based on the priority, a single MFP to be presented. For example, the priority may be set beforehand by the user or may be determined based on the printing history (use history). The printing history may be obtained from each MFP in this case. Also, when the determined MFP is to be presented on the chat app, the determined MFP may be presented together with the printing history information (the date, the use purpose, the number of uses, and the like).

In addition, in a case in which it is determined that the MFP cannot be used due to a failure or the like when an inquiry about the operation state of the printing apparatus is performed, substitution processing such as searching for another MFP in the same network may be performed. In this embodiment, the following description will be made by assuming that the selected MFP has been confirmed to be usable.

In step S306, the application server 160 generates the information of the MFP which has been confirmed to be usable in step S305 and the data of a printing confirmation screen for confirming the print settings, and transmits the generated information and data to the host computer 191 via the WAN 180. This process corresponds to the process of S206 in FIG. 2. As a result, the printing confirmation screen is displayed on the web browser of the host computer 191.

Figure 6B:
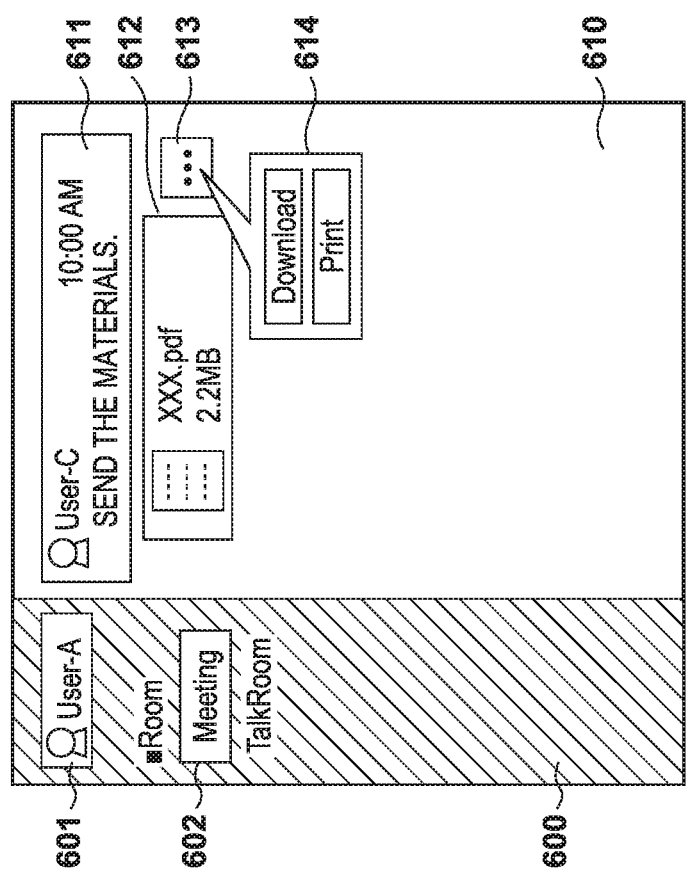

FIG. 6B shows an example of the arrangement of the printing confirmation screen which is displayed on the chat screen. A message for assisting the usage, the current date and time information, the device information of the MFP, and the print settings based on the record 510 are displayed in a confirmation message 615 from the bot. In addition, an OK button 620, a Cancel button 621, a device change button 622, and a setting change button 623 are displayed so that the next processing can be instructed to the bot.

Figure 6C:
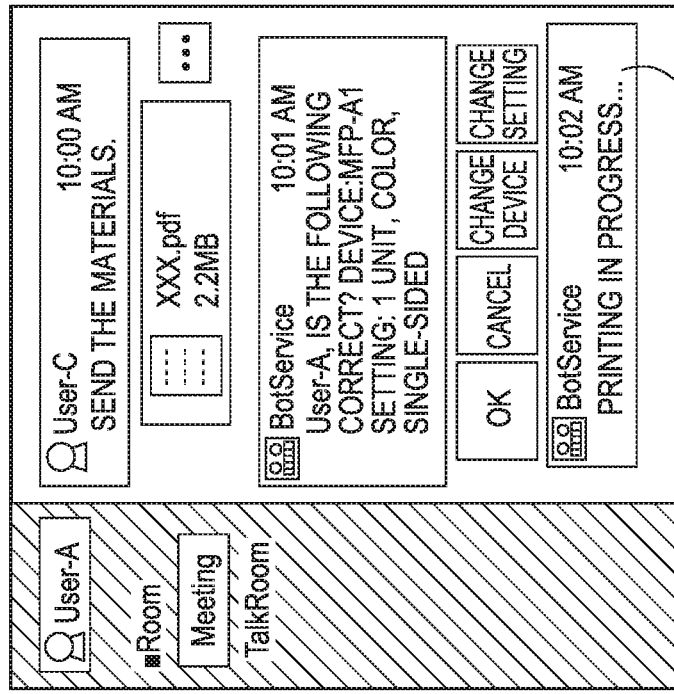

FIG. 6C shows an example of the arrangement of the printing confirmation screen that is displayed on the chat screen in a case in which a login username 603 is "User-B" and the record 511 has been set in step S304. A message for assisting the usage, the current date and time information, the device information of the MFP, and the print settings based on the record 511 are displayed in a confirmation message 616 from the bot. In this manner, the bot service can switch the MFP device and the print settings based on the information of the user who made the printing request so that print processing can be performed smoothly from a bot which can be commonly used.

In step S307, the application server 160 accepts the user operation input to the printing confirmation screen on the chat screen. Subsequently, the application server 160 determines the type of the input user operation. If the OK button 620 has been selected, the process advances to step S310. If the Cancel button 621 has been selected, the process advances to step S314. If the device change button 622 has been selected, the process advances to step S308. If the setting change button 623 has been selected, the process advances to step S309. A case in which the OK button 620 has been selected corresponds to the issuance of the file printing instruction in S207 of FIG. 2.

In step S308, the application server 160 accepts, via the operation unit 195 of the host computer 191, an operation to change the MFP device from the user. Subsequently, the process returns to step S305. In response to this device change, a search for another usable MFP (for example, the printing apparatus 101 which is another MFP connected to the network 190) may be performed and alternative MFP candidates may be displayed so that it will be easier for the user to make a selection.

In step S309, the application server 160 accepts, via the operation unit 195 of the host computer 191, a print setting change operation from the user. Subsequently, the process returns to step S305.

In step S310, the application server 160 generates print data in accordance with the print settings designated by the user. This embodiment describes "direct printing" which adds print settings to data, such as PDF data, formatted to be operable and viewable on an application and be usable as print data. A data conversion service (not shown) that converts print data can be used in a case in which the data is not in a format that can be used as print data. In this case, the MFP username "AAA111" is set as the username to be listed in the print settings based on the record 510. That is, the user account of the printing apparatus to be used for printing will be set. This process of the MFP corresponds to the process of S208 in FIG. 2.

In step S311, the application server 160 transmits, via the WAN 180, the print job including the print data generated in step S310, to the printing apparatus 100. This process corresponds to the process of step S209 in FIG. 2.

Figure 6D:
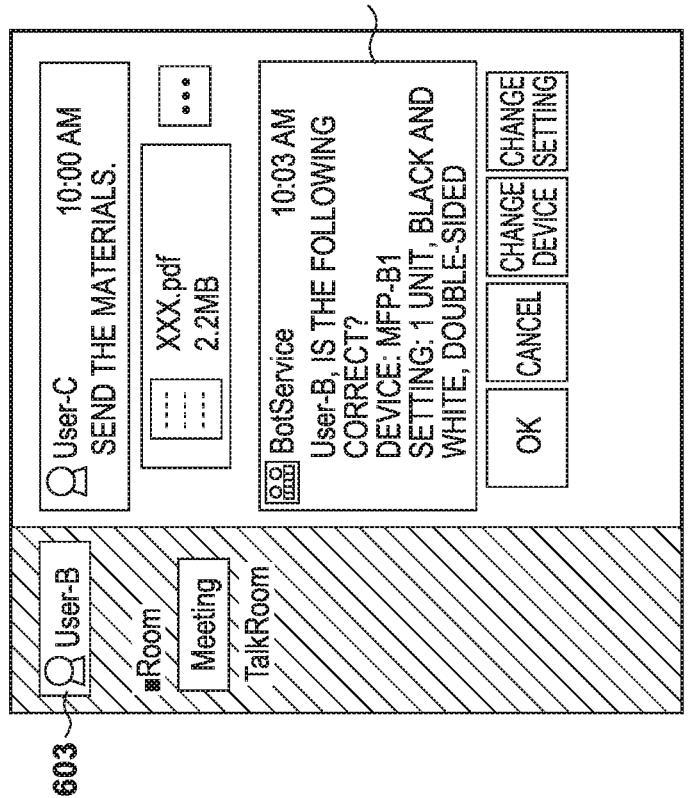
Figure 7D:
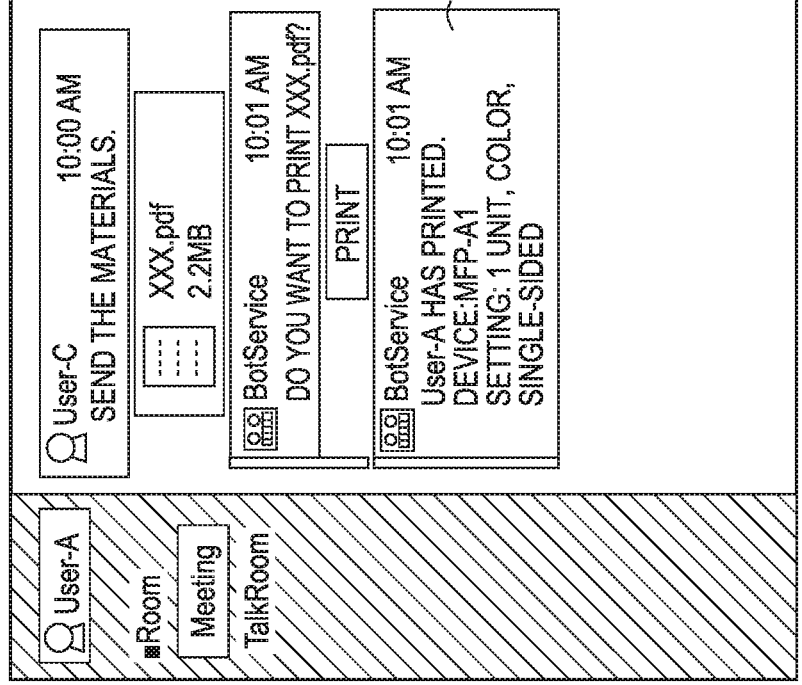
Figure 7E:
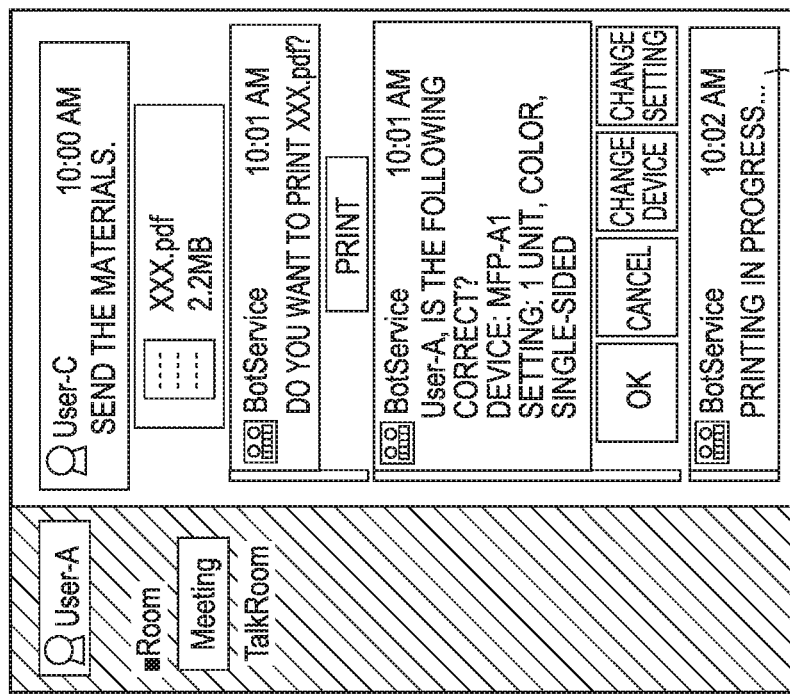

In step S312, the application server 160 receives, from the printing apparatus 100, the print result of the print job transmitted in step S311. This process corresponds to the process of S211 in FIG. 2. Note that control may be performed so that a message 617, as shown in FIG. 6D, which notifies the user that printing is being executed will be displayed on the chat screen until the print result is received.

In step S313, based on the print result received in step S312, the application server 160 updates the message to be displayed on the chat screen. For example, the printing confirmation screen (the confirmation message 615 and various kinds of buttons (620 to 623)) on the chat screen as shown in FIG. 6B and the message 617 on the chat screen shown in FIG. 6D are deleted. The application server 160 also generates, based on the record 510, a printing history message noting the fact that printing has been executed. This process corresponds to the process of S212 in FIG. 2.

In step S314, the application server 160 ends the bot service. At this time, the application server 160 may update the setting file of the bot service stored in the RAM or the storage device. This process corresponds to the process of S213 in FIG. 2.

In step S315, the application server 160 transmits the contents of the message updated in step S313 to the host computer 191 via the WAN 180. As a result, a message screen is displayed on the chat screen. This process corresponds to the process of S214 in FIG. 2. FIG. 6E shows an example of a screen displaying the updated message. A message 618 related to the printing history is displayed on this screen. FIG. 6E shows an example in which the message 618 is displayed as a thread of the message (the attachment file 612) posted by "User-C". As a result, the participating members of the chat app can grasp who has printed the attachment file 612. Note that the display method of the message related to the printing history is not limited to this, and the message may also be displayed as a normal message. Subsequently, this processing procedure ends.

(Processing by Printing Apparatus)

Figure 4:
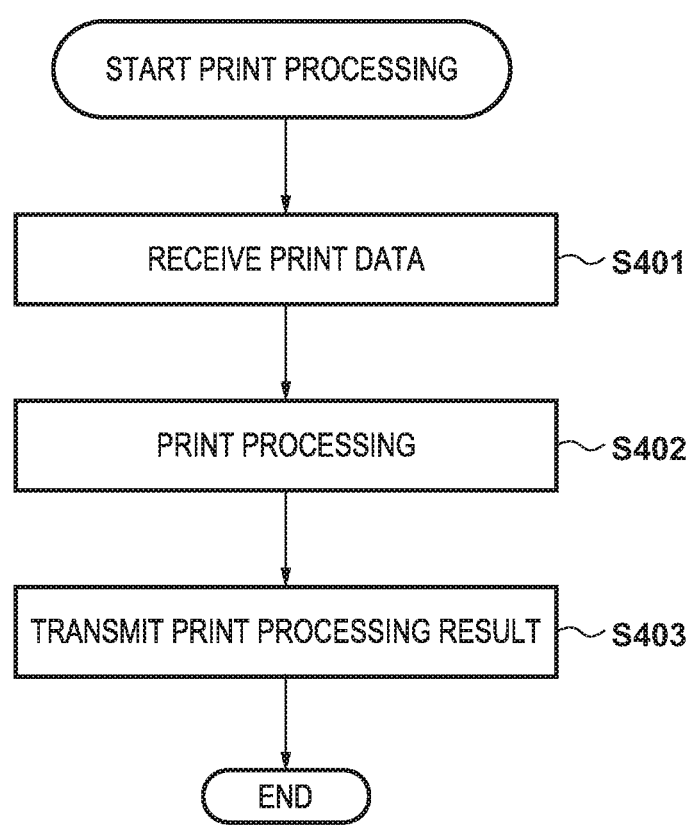
FIG. 4 is a flowchart of print processing according to the first embodiment.

FIG. 4 is a flowchart showing the print processing by the printing apparatus 100. This processing procedure focuses on the processing performed by the printing apparatus 100 among the processing procedures described in the processing sequence shown in FIG. 2. The processing of FIG. 4 is implemented by the CPU 111 of the printing apparatus 100 reading out, to the RAM 113, a program stored in the ROM 112 and executing the program. In this embodiment, the processing of FIG. 4 is started when the printing apparatus 100 receives the print data transmitted from the application server 160.

In step S401, the printing apparatus 100 receives a print job including the print data transmitted from the application server 160. This process corresponds to the process of S209 in FIG. 2. Note that the printing apparatus 100 may temporarily store the received print data in the RAM 113 or the storage device 150 to wait for the completion of the processing of a preceding print job, and subsequently perform the processing when it becomes the turn of the received print data to undergo the print processing.

In step S402, the printing apparatus 100 generates intermediate data by interpreting the print data received in step S401. Furthermore, the printing apparatus 100 uses the rendering HW 115 to generate a rendered image and transfers the generated image data to the printer unit 130. The printer unit 130 executes print processing based on the received image data by forming an image on a print medium such as a sheet. At this time, print processing will be performed by using the user account of the printing apparatus 100 set by the print job, and the processing contents will be stored in the printing history. As a result, it will be possible to use the printing history to specify which account has executed the printing on the side of the printing apparatus. Subsequently, the printing apparatus 100 performs post processing such as deletion of print data that has been temporarily stored. Note that a known method can be used for the procedure of print processing, and the method is not particularly limited. This process corresponds to the process of S210 in FIG. 2.

In step S403, the printing apparatus 100 generates the result of the print processing executed in step S402 and transmits the result to the application server 160 via the WAN 180. This process corresponds to the process of S211 in FIG. 2. Subsequently, this processing procedure ends.

Note that this embodiment described a case when a file like the attachment file 612 is attached to a message on a chat app. However, the present invention is not limited to this arrangement. A similar kind of processing may also be performed in a case in which a URL (Uniform Resource Locator) that stores a file by a data storage service or the like is written as a message.

As described above, according to this embodiment, a suitable image forming apparatus corresponding to each user can be used in a case in which printing is to be performed via chat.

Second Embodiment

The second embodiment of the present invention will be described hereinafter. Note that points different from the first embodiment will be described, and a description of overlapping parts will be omitted. This embodiment describes a mode in which a bot service performs an operation to recommend printing in response to an attachment file being posted on a chat app.

[Processing Sequence]

FIG. 9 is a sequence chart showing the processing procedures of a host computer 191, an application server 160, and a printing apparatus 100 according to this embodiment. In this embodiment, assume that the cooperation between the application server 160 and the host computer 191 will be performed via a chat app. Note that although not shown in FIG. 9, assume that that the other host computer and printing apparatuses can also operate in a similar manner.

In S901, the application server 160 activates a bot service to support a file printing operation. This activation may be performed by executing a program corresponding to the bot service. Furthermore, the application server 160 loads setting files held in a RAM 194 and a storage device 196 and sets the initial settings of the bot service.

In S902, the application server 160 detects that an arbitrary user has input (posted) an attachment file on the chat app.

In S903, in response to the detection of the attachment file in S902, the application server 160 causes the bot service to display a message (a recommendation message screen) on the chat screen.

In S904, the host computer 191 displays the message on the chat screen. Subsequently, in response to accepting a file printing request from the user via the recommendation message screen, the host computer 191 transmits the file printing request to the application server 160.

In S905, the application server 160 confirms a printing apparatus usable for file printing and the settings of this printing apparatus.

In S906, based on the result of the confirmation processing performed in S905, the application server 160 causes the bot service to display a message (a printing confirmation screen) on the chat screen.

In S907, based on an instruction received from the application server 160, the host computer 191 displays the printing confirmation screen on the chat screen. Subsequently, in response to accepting a file printing instruction from the user on the printing confirmation screen, the host computer 191 transmits the file printing instruction to the application server 160.

In S908, the application server 160 generates print data based on the file printing instruction received from the host computer 191.

In S909, the application server 160 transmits a print job including the generated print data to the printing apparatus 100 designated in the file printing instruction.

In S910, the printing apparatus 100 performs print processing by using the print job received from the application server 160.

In S911, the printing apparatus 100 transmits the result of the print processing executed in S910 to the application server 160.

In S912, the application server 160 updates the message and the information of the bot service which are to be displayed on the file operation screen of the chat app.

In S913, the application server 160 displays, on the chat screen, the message updated in S912.

In S914, the application server 160 ends the bot service. The end timing of the bot service is not particularly limited, and, for example, the bot service may end at the point when the chat ends in the chat app. Subsequently, the processing sequence ends.

(Processing by Application Server)

Figure 10:
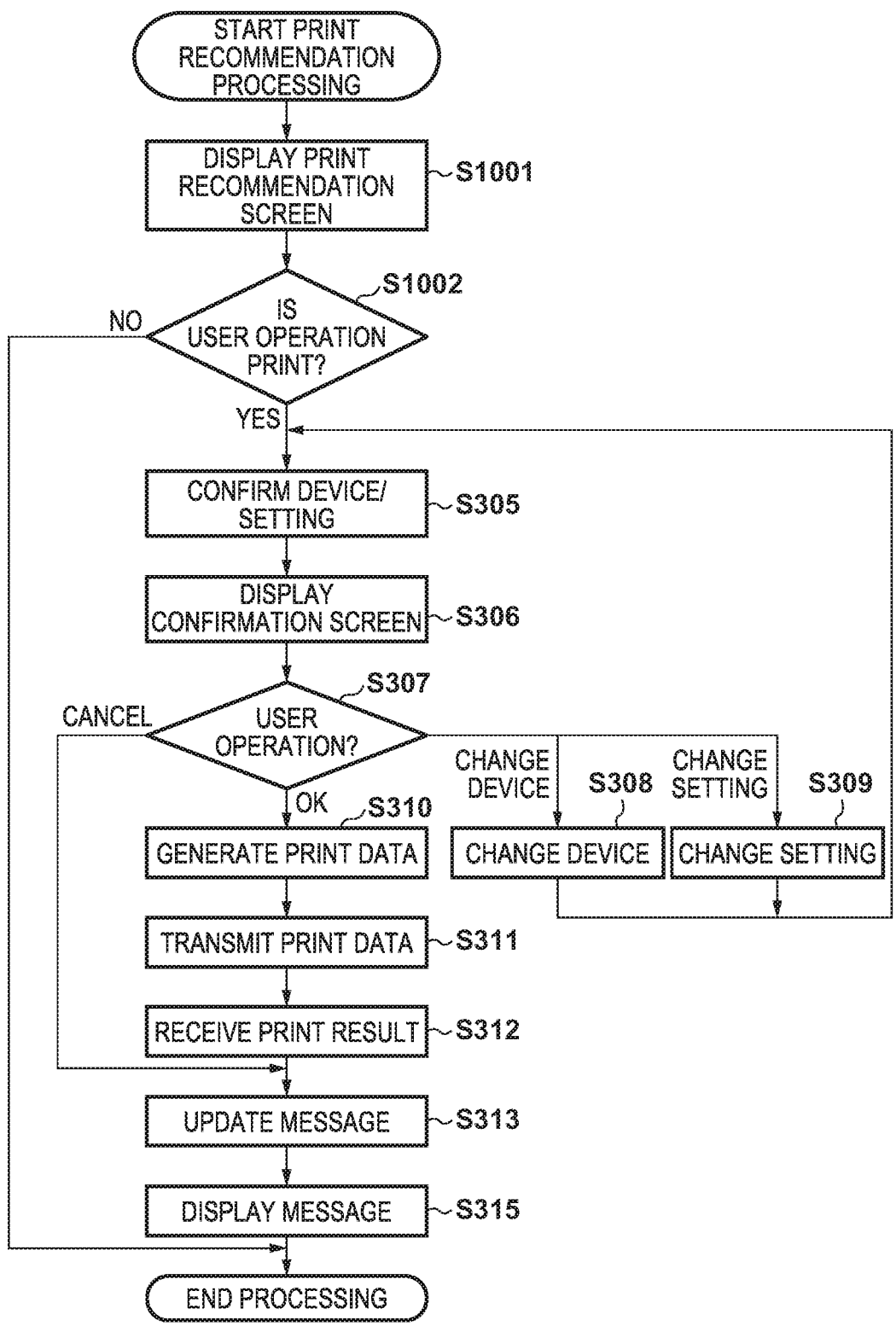
FIG. 10 is a flowchart showing print recommendation processing according to the second embodiment.

FIG. 10 is a flowchart showing the processing of the application server 160 according to this embodiment. This processing procedure focuses on the processing performed by the application server 160 among the processing procedures described in the processing sequence shown in FIG. 9. As described above, since the activation and the ending (S901 and S914 of FIG. 9) according to this embodiment are executed at timings different from the timing at which the printing recommendation processing is requested, they are not included in the processing procedure of FIG. 10.

The processing of FIG. 10 is implemented by, for example, the CPU of the application server 160 reading out, to the RAM, a program stored in the ROM and executing the program. In this embodiment, the start of the processing of FIG. 10 is triggered when the bot service has detected an attachment file. FIGS. 7A to 7E show display screen arrangement examples of the chat app according to this embodiment. The processing procedure will be described along with the transition of the screen hereinafter.

In S1001, the application server 160 generates data of a recommendation message screen for assisting the printing operation for the attachment file detected by the bot service, and transmits the generated data to the host computer 191. As a result, the recommendation message screen is displayed on the chat screen in the host computer 191. This process corresponds to the process of S903 in FIG. 9.

FIG. 7A shows an example of the arrangement of the recommendation message screen on the chat screen according to this embodiment. FIG. 7A shows an example in which a message 701 by which the bot service assists the printing operation and a printing request button 702 are displayed in response to the posting of a message 611 and an attachment file 612 by the user. Assume also that this chat screen is displayed on a web browser of an information processing apparatus (a host computer) used by a user "User-A" in the manner shown by a username 601.

In step S1002, the application server 160 accepts, via an operation unit 195 of the host computer 191, a user operation input on the recommendation message screen on the chat screen. The application server 160 determines whether the input user operation is an operation to select the printing request button 702. If it is determined that the printing request button 702 has been selected (YES in step S1002), the process advances to step S305. Otherwise (NO in step S1002), the processing procedure ends.

The processes of step S305 and subsequent steps are similar to those of FIG. 3 of the first embodiment other than the point that the processing to end the bot service is not performed in step S314.

In this embodiment, the bot service performs subsequent processes while maintaining the display of the message 701 for assisting the printing operation and the printing request button 702. Hence, display results as shown in FIGS. 7B to 7E are obtained. That is, in a similar manner to the first embodiment, each screen displayed during the execution of the printing operation will be deleted from the chat screen. This is because a state in which printing is to be executed by another user and a state in which printing is to be executed after a predetermined time has elapsed are assumed in this embodiment. In addition, in FIGS. 7A to 7E, each message issued by the bot service is displayed in a thread. Note that to prevent messages from being displayed excessively, the messages 701 and the corresponding printing request buttons 702 that have become old may be deleted when the number of attachment files have exceeded a predetermined number.

As described above, according to this embodiment, in a case in which printing is to be performed via a chat app, each user will be able to use a suitable image forming apparatus corresponding to the user.

Third Embodiment

The third embodiment of the present invention will be described hereinafter. Note that points different from the first embodiment will be described, and a description of overlapping parts will be omitted. This embodiment describes a mode for a case in which an image is to be shared by performing a scanning operation by an image forming apparatus on a chat app.

Figure 11:
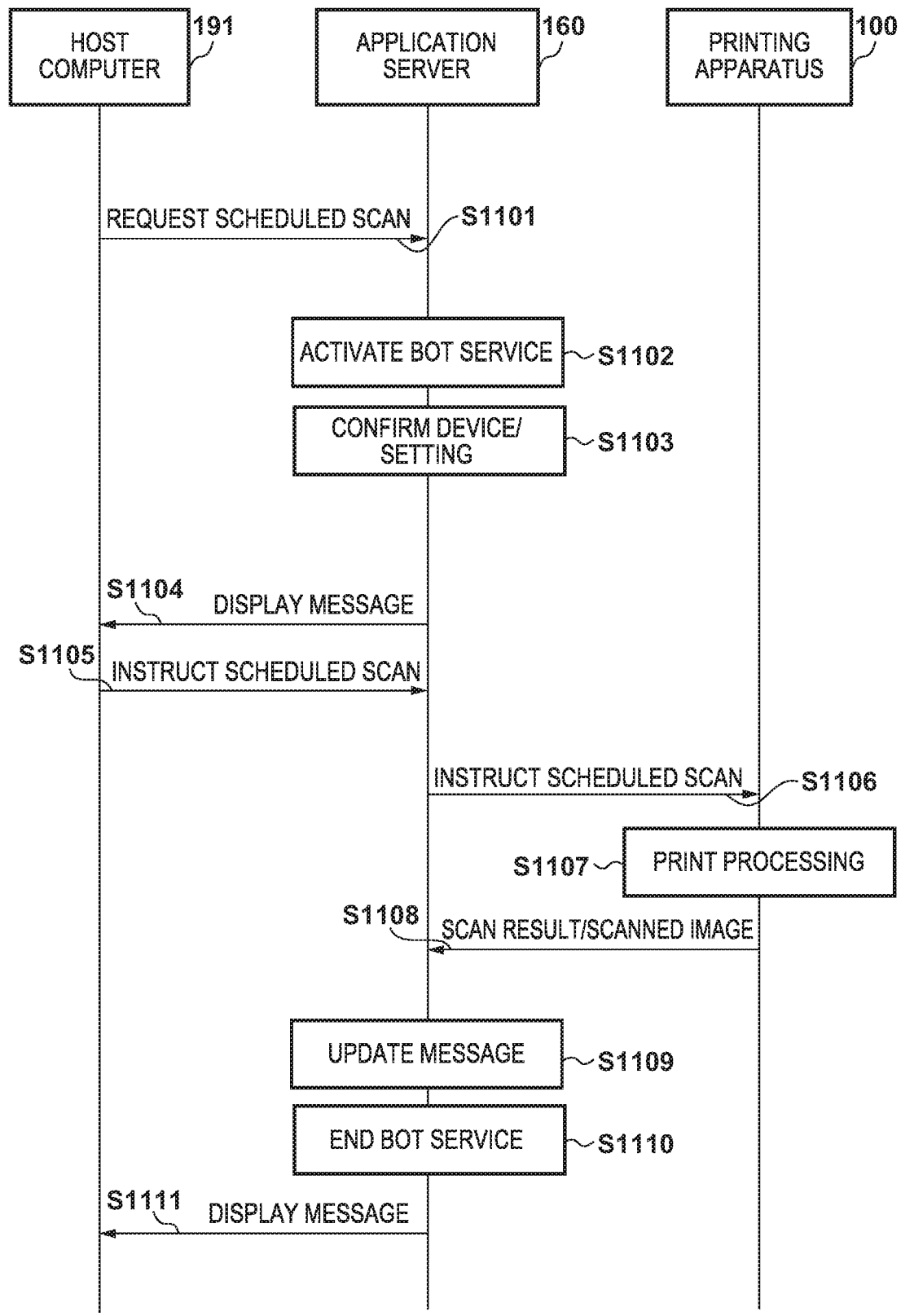
FIG. 11 is a sequence chart showing a series of processing procedures according to the third embodiment.

FIG. 11 is a sequence chart showing the processing procedures of a host computer 191, an application server 160, and a printing apparatus 100 according to this embodiment. In this embodiment, assume that the cooperation between the application server 160 and the host computer 191 will be performed via a chat app. Note that although not shown in FIG. 11, assume that the other host computer and printing apparatuses can also operate in a similar manner.

In S1101, the host computer 191 accepts a scheduled scan request from a user via a chat screen and transmits the request to the application server 160. The display examples of the chat screen according to this embodiment will be described later with reference to FIGS. 8A to 8E.

In S1102, the application server 160 activates a bot service that supports the operation. This activation may be performed by executing a program corresponding to the bot service.

In S1103, the application server 160 confirms a printing apparatus usable in the scanning operation and the settings of this printing apparatus.

In S1104, based on the result of the confirmation processing performed in S1103, the application server 160 causes the bot service to display a scheduled scan confirmation screen on the chat screen.

In S1105, based on the instruction received from the application server 160, the host computer 191 displays the scheduled scan confirmation screen on the chat screen. Subsequently, in response to accepting a scheduled scan instruction from the user, the host computer 191 transmits the scheduled scan instruction to the application server 160.

In S1106, the application server 160 transmits the scheduled scan instruction to the printing apparatus 100 designated in the scheduled scan instruction received from the host computer 191.

In S1107, based on the scheduled scan instruction received from the application server 160, the printing apparatus 100 performs scan processing.

In S1108, the printing apparatus 100 transmits the result of the scan processing executed in S1107 and the scanned image data to the application server 160.

In S1109, the application server 160 updates the message to be displayed by the bot service on the chat screen.

In S1110, the application server 160 ends the bot service.

In S1111, the application server 160 causes the message that was updated in S1110 to be displayed on the chat screen. Subsequently, the processing sequence ends.

(Processing by Application Server)

Figure 12:
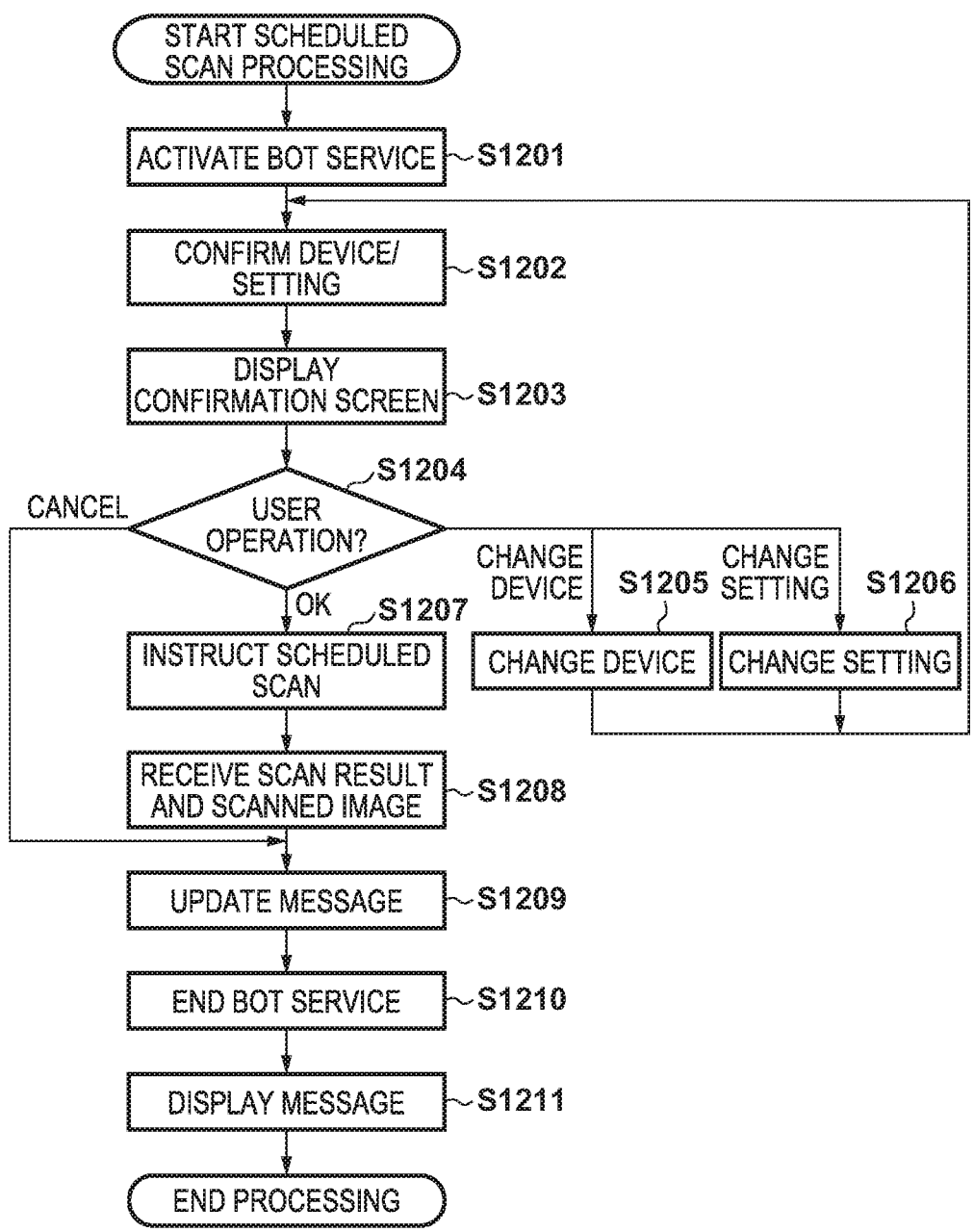
FIG. 12 is a flowchart showing scheduled scan processing according to the third embodiment.

FIG. 12 is a flowchart showing the processing by performed the application server 160. This processing focuses on the processing procedure performed by the application server 160 among the processing procedures described in the processing sequence shown in FIG. 11. The processing of FIG. 12 is implemented by, for example, the CPU of the application server 160 reading out, to the RAM, a program stored in the ROM and executing the program.

Figure 8B:
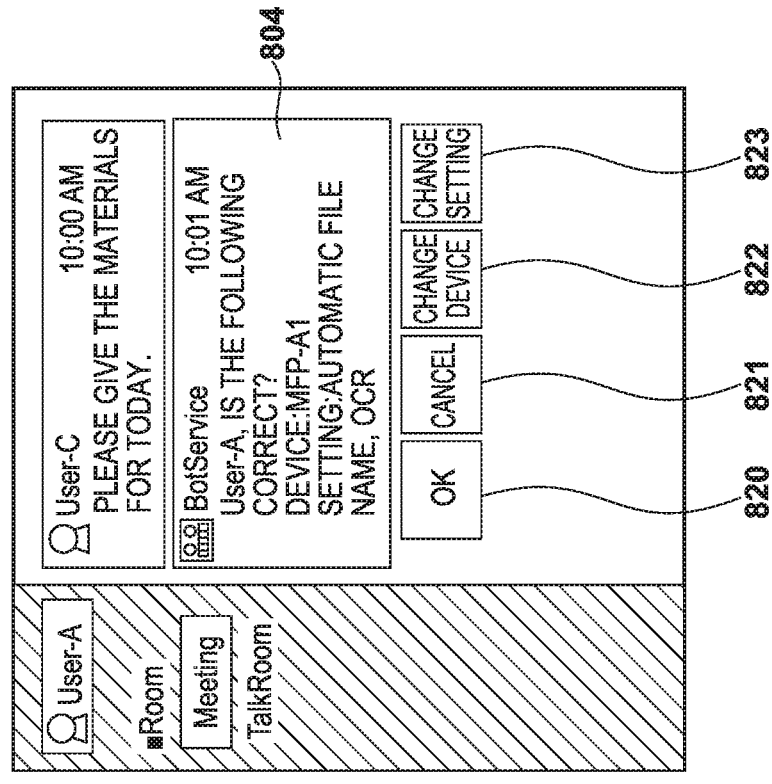
FIGS. 8A, 8B, 8C, 8D, and 8E are views showing examples of a display screen of a chat application according to the third embodiment.
Figure 8A:
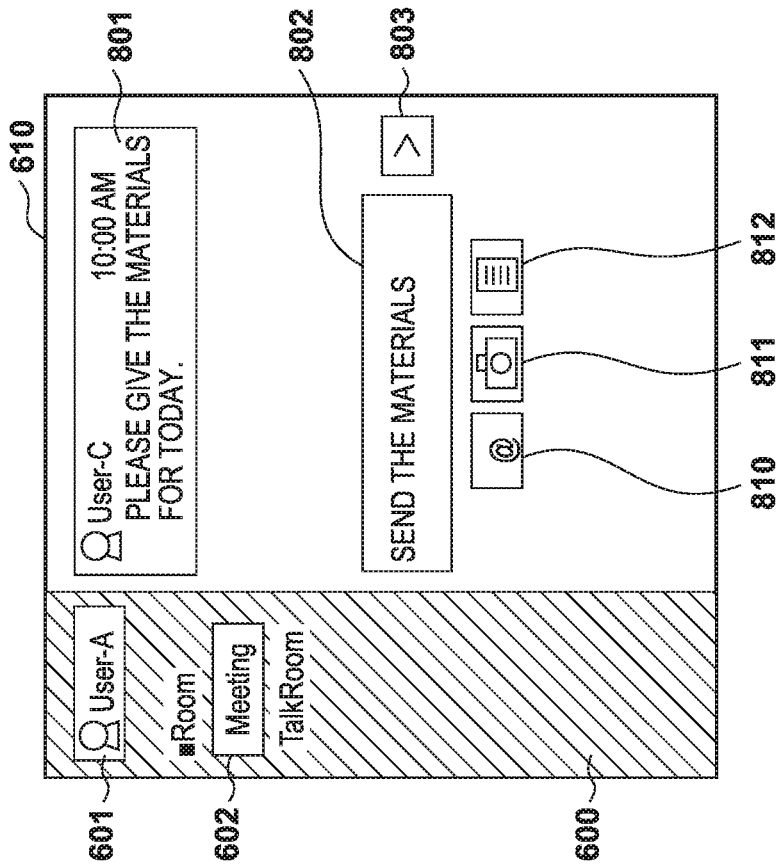

FIGS. 8A to 8E show chat screen arrangement examples according to this embodiment. FIG. 8A is an example of a screen displaying messages of a chat app. Assume that this chat screen is displayed on the web browser of an information processing apparatus (a host computer) used by a user "User-A" as shown by a username 601. A message 801 posted by another user ("User-C" in this case") has been displayed. In addition, a message region 802, a transmission button 803, a mention button 810, a camera button 811, and a scheduled scan button 812 are also displayed on the chat screen.

In this embodiment, the processing of FIG. 12 is started when a user inputs a message on the message region 802 of the chat screen on web browser of the host computer 191 and makes operation to select the scheduled scan button 812. Alternatively, the processing may be started when the user makes an operation to select the transmission button 803 in a state in which a message has been input to the message region 802 and the scheduled scan button 812 has been set.

In step S1201, the application server 160 activates a bot service for assisting the execution of a scheduled scan. Furthermore, the application server 160 loads setting files stored in a RAM and a storage device and sets the initial settings of the bot service. FIGS. 5A to 5E are examples of information stored as setting files of the bot service. In this embodiment, the following description will be made by assuming that a record 510 has been set based on the username 601. This process corresponds to the process of S1102 in FIG. 11.

In S1202, based on the information of the record 510 set in the bot service in step S1201, the application server 160 makes an inquiry to the printing apparatus 100 as to whether the set MFP and the set scan settings can be used. In this case, if the MFP cannot be used due to a failure or the like, substitution processing may be performed to search for another MFP on the same network or the like. In this embodiment, the following description will be made by assuming that the set MFP and the set scan settings have been confirmed to be usable.

In step S1203, the application server 160 generates scheduled scan confirmation screen data for confirming the information of the MFP and the scan settings that have been confirmed to be usable in step S1202, and transmits the generated data to the host computer 191. This process corresponds to the process of S1104 in FIG. 11. As a result, a scheduled scan confirmation screen is displayed on the chat screen of the host computer 191.

FIG. 8B shows an example of the arrangement of the scheduled scan confirmation screen on the chat screen. Based on the record 510, a message for assisting the usage, the current date and time information, the device information of the MFP, and the scan settings are displayed on a confirmation message 804 from the bot. Also, an OK button 820, a Cancel button 821, a device change button 822, and a setting change button 823 are displayed so that the next processing can be instructed to the bot.

Figure 8C:
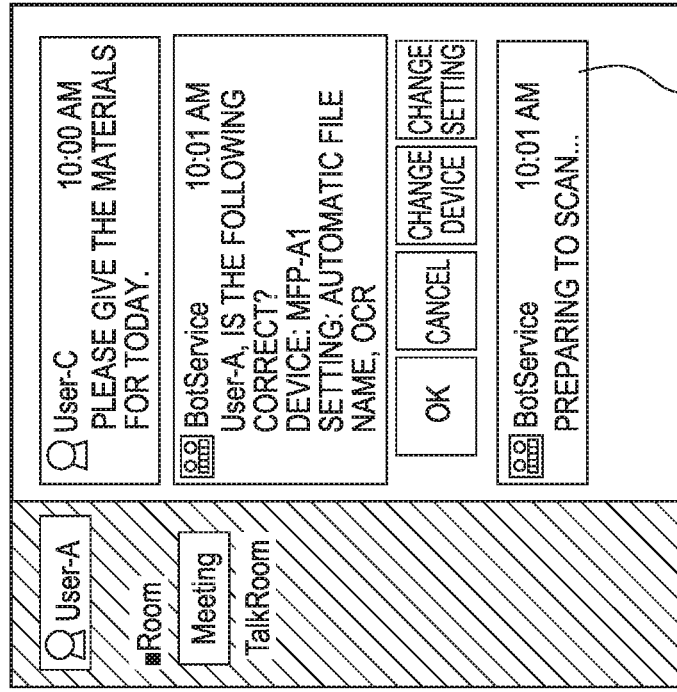

FIG. 8C shows an example of the arrangement of the scheduled scan confirmation screen on the chat screen in a case in which a login username 603 is "User-B" and the record 511 has been set. A message for assisting the usage, the current date and time information, the device information of the MFP, and the scan settings based on the record 511 are displayed on a confirmation message 805 from the bot. In this manner, the bot service can switch the MFP device and the scan settings based on the information of the user who made the scheduled scan request so that scan processing can be performed smoothly from a bot which can be commonly used.

In step S1204, the application server 160 accepts, via an operation unit 195 of the host computer 191, a user operation input on the scheduled scan confirmation screen. Subsequently, the application server 160 determines the type of the input user operation. If the OK button 820 has been selected, the process advances to step S1207. If the Cancel button 821 has been selected, the process advances to step S1209. If the device change button 822 has been selected, the process advances to step S1205. If the setting change button 823 has been selected, the process advances to step S1206. A case in which the OK button 820 has been selected corresponds to the issuance of the scheduled scan instruction in S1105 of FIG. 11.

In step S1205, the application server 160 accepts, via the operation unit 195 of the host computer 191, an operation to change the MFP device from the user. Subsequently, the process returns to step S1202. In response to this device change, a search for another usable MFP (for example, a printing apparatus 101 which is another MFP connected to a network 190) may be performed and alternative MFP candidates may be displayed so that it will be easier for the user to make a selection.

In step S1206, the application server 160 accepts, via the operation unit 195 of the host computer 191, a scan setting change operation from the user. Subsequently, the process returns to step S1202.

In step S1207, the application server 160 generates the scheduled scan setting data in accordance with the scan settings designated by the user. In this case, based on the record 510, the username "User-A" of the chat app is set as the username of the scheduled scan setting data. The MFP username "AAA111" is set as the username to be recorded on the operation history of the printing apparatus 100 based on the record 510. That is, the user account of the printing apparatus to be used for scanning will be set. In addition, the scheduled scan setting data will include an instruction to include the username of the chat app in the scan image data. Subsequently, the application server 160 transmits the scheduled scan instruction including the generated scheduled scan setting data to the printing apparatus 100. This process corresponds to the process of S1106 in FIG. 11.

In step S1208, the application server 160 receives, from the printing apparatus 100, the scan result and the scan image data of the scheduled scan instruction transmitted in step S1207. Note that control may be performed so that a message 806 indicating that scanning is being executed will be displayed on the chat screen in the manner of FIG. 8D until the scan result is received.

Figure 8D:
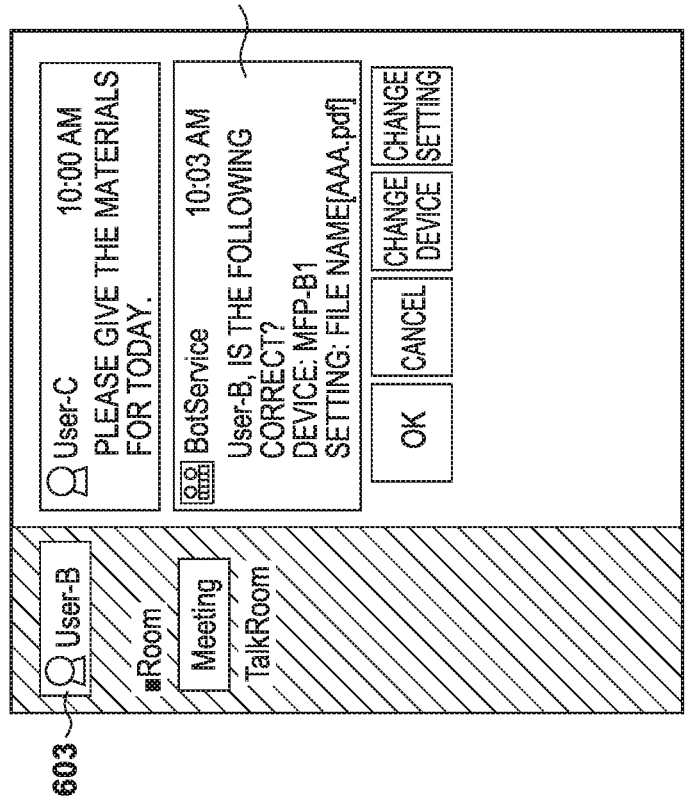

In step S1209, based on the scan result and the scan image data received in step S1208, the application server 160 updates the message to be displayed on the chat screen. For example, the scheduled scan confirmation screen (the confirmation message 804 and the various kinds of buttons (820 to 823)) shown in FIG. 8B and the message 806 shown in FIG. 8D are deleted. The application server 160 also generates a message including the received scan image data as an attachment in the message input to the message region 802 by the user. This process corresponds to the process of S1109 in FIG. 11.

In step S1210, the application server 160 ends the bot service. At this time, the application server 160 may update the setting files of the bot service stored in the RAM and the storage device. This process corresponds to the process of S1110 in FIG. 11.

Figure 8E:
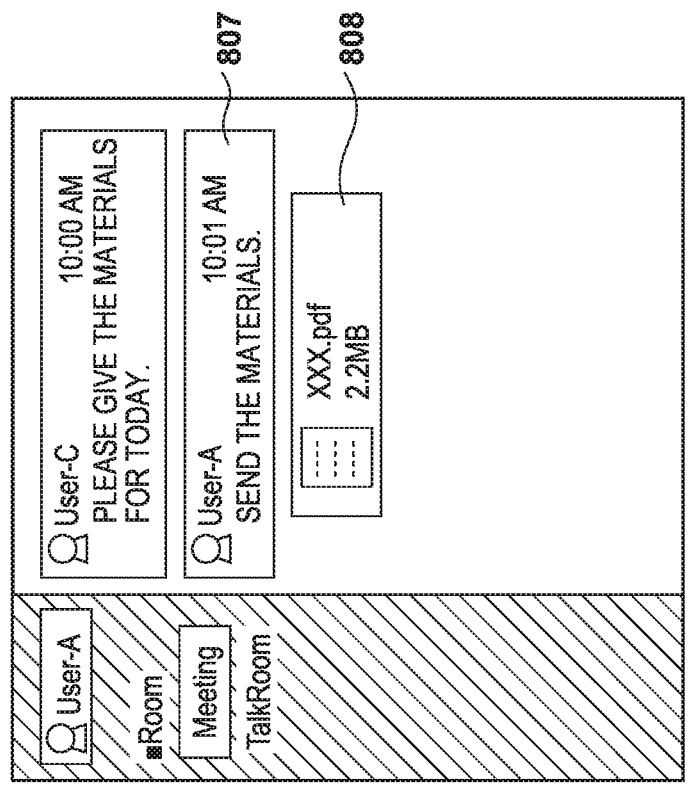

In step S1211, the application server 160 transmits the contents of the message updated in step S1209 to the host computer 191 via a WAN 180. As a result, a message screen is displayed on the chat screen of the host computer 191. This process corresponds to the process of S1111 in FIG. 11. FIG. 8E is an example of the screen displaying the updated message. On the chat screen, a scanned image data 808 has been attached together with a message 807 input by the user. Note that the message has been inserted into the position where the scheduled scan was started in this case. However, in a case in which another user has made a post during the processing of a scheduled scan, a message corresponding to the scheduled scan may be posted as a new message so that the post will be more obvious. Subsequently, the processing procedure ends.

(Processing by Printing Apparatus)

Figure 13:
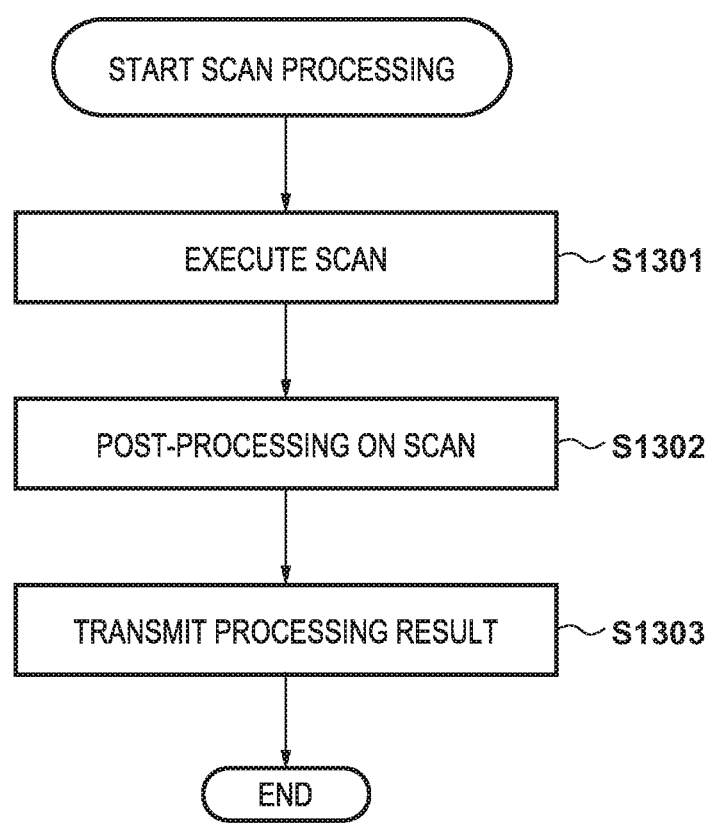
FIG. 13 is a flowchart of scan processing according to the third embodiment.

FIG. 13 is a flowchart showing the scan processing by the printing apparatus 100. This processing procedure focuses on the processing performed by the printing apparatus 100 among the processing procedures described in the processing sequence shown in FIG. 11. The processing of FIG. 13 is implemented by a CPU 111 of the printing apparatus 100 reading out, to a RAM 113, a program stored in a ROM 112 and executing the program. The processing of FIG. 13 is started when the printing apparatus accepts a scan processing instruction from the user. In this case, assume that a state in which the user has logged in to the printing apparatus 100 and the printing apparatus can be used has been set under an environment in which user management is being performed.

In addition, assume that the printing apparatus 100 has received the scheduled scan instruction transmitted from the application server 160 in step S1207 in FIG. 12 and that the contents of the scheduled scan setting data set in the scheduled scan instruction has been reflected in advance. More specifically, the presence/absence of OCR processing, the initial values of scan settings such as the data format, the image processing, and the like are reflected, and a setting to make an operation button for the scheduled scan more easily selectable can be performed.

In step S1301, upon accepting a scheduled scan instruction from the user via an operation unit 140, the printing apparatus 100 generates scanned image data by using a reader unit 120 to perform a scan operation on a target original. This process corresponds to the process of S1109 in FIG. 11. Note that the printing apparatus 100 may wait to perform the scan operation until the target original is placed, and may start the scan operation at the point when the user has selected the operation button.

In step S1302, based on the scan settings, the printing apparatus 100 performs post-processing on the scanned image data generated in step S1301. For example, if there is an OCR scan setting, the OCR processing is performed on the scanned image data generated in step S1301, and the processed data is converted into a document format such as PDF that allows a full-text search to be performed. The contents of the post-processing are not particularly limited and may be changed in accordance with the functions and the like of the printing apparatus 100. In addition, the printing apparatus 100 adds the chat app username indicated in the scheduled scan instruction setting data to the generated scanned image data.

In step S1303, the printing apparatus 100 generates a scan processing result and transmits the scanned image data and the information of the scan processing result to the application server 160 via the WAN 180. This process corresponds to the process of S1108 in FIG. 11. Subsequently, the processing procedure ends.

The case of an image processing apparatus (scanner) that is used by a plurality of people was assumed and a format referred to as a "scheduled scan" was exemplified in this embodiment. However, in the case of a device, such as a desktop scanner, which is assumed to be used by a single user, it may be arranged so that scan execution will be able to be instructed immediately from the chat app.

In addition, in the process of step S1201 in FIG. 12, processing was performed based on pre-set user information. However, a suitable image processing apparatus may be specified by using the real-time user position information obtained by a position information management service or the like.

Furthermore, this embodiment is not limited to an arrangement, like the arrangement of the scanned image data 808 shown in FIG. 8E, in which the scanned image data is attached as a file on the chat screen of the chat app. For example, the file may be stored in a data storage service or the like, and the URL of this stored file may be displayed as a message on the chat screen.

<Modification>

Although the above-described embodiments exemplified a case in which a chat application service and a bot service are included in the application server 160 and the user information and the printers are managed by the application server 160, the present invention is not limited to this. For example, the present invention is also applicable to a case in which an image processing apparatus (for example, a printer) suitable for the user is to be selected as one of the functions to be provided on a cloud platform. The cloud platform may include services to be performed on a cloud such as a chat application, a bot service, a cloud printing service, webmail, document generation and editing, and the like.

Figure 14:
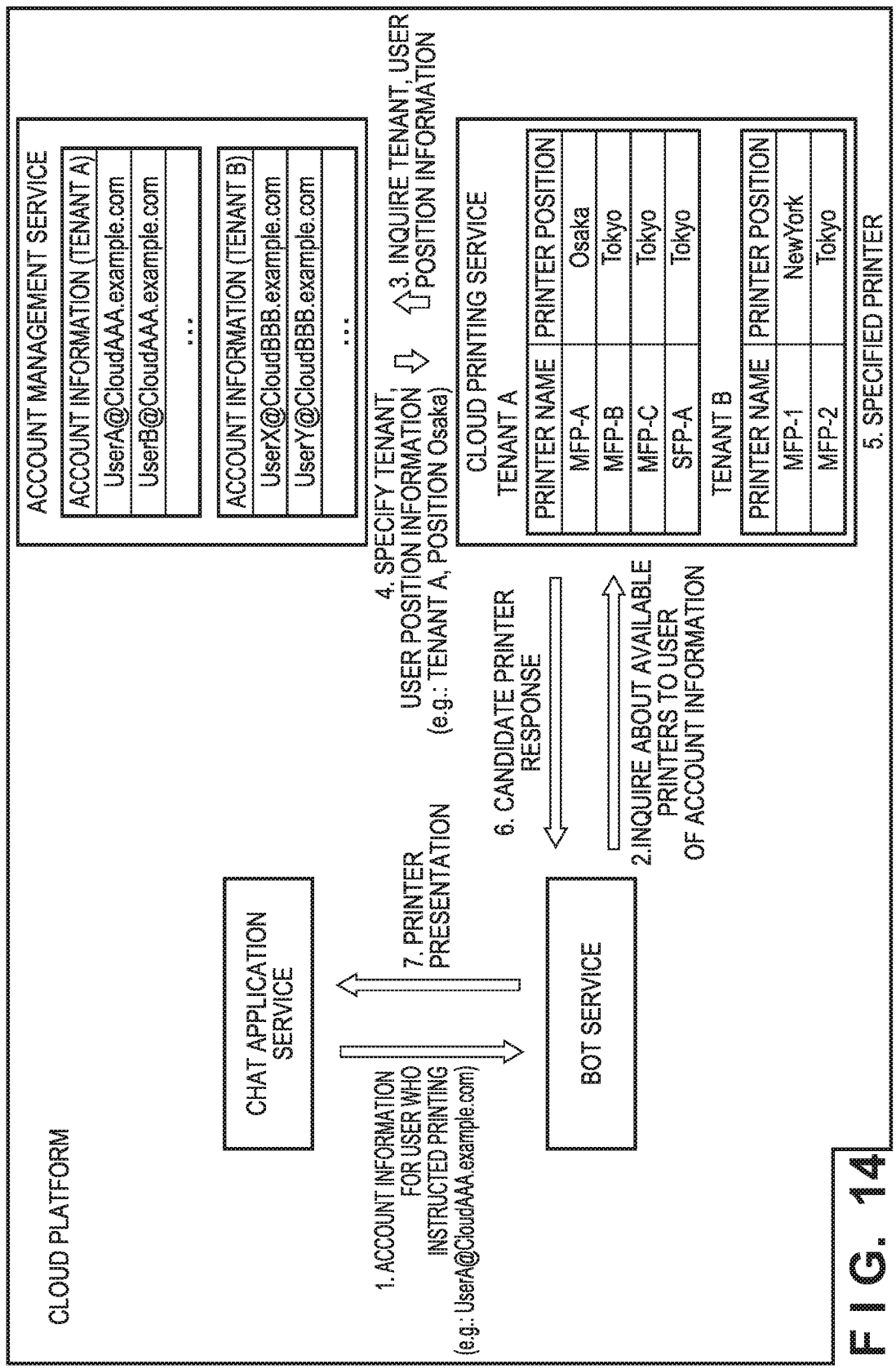
FIG. 14 is a view showing an example of a cloud platform according to an embodiment of the present invention.

FIG. 14 is a schematic view for explaining this modification. A description will be given hereinafter with reference to the procedure shown in FIG. 14 as an example.

In the above-described embodiments, upon detecting that a "Print" key described in FIGS. 6A to 6E and FIGS. 7A to 7E has been selected, the bot service specifies the account of the user who has pressed the Print key. In this case, the user account suffices to be an account for identifying the user on the cloud platform, and will be assumed to be, for example, "User@CloudAAA.example.com".

Next, the bot service makes an inquiry, to the cloud printing service provided by the cloud platform, about a printer that can be used by the user of the account information.

The cloud printing service uses an API (Application Programming Interface) of an account management service provided by the cloud platform to obtain a tenant to which the user belongs. The API can also be used to obtain the user's activity information such as the location and the like. Note that each tenant is an organization unit that provides a service on the cloud platform. In this case, based on the account information of "UserA@CloudAAA.example.com", "tenant A" is obtained as the tenant information of the tenant to which the user belongs. In a similar manner, the information indicating that the user is currently logged in from a position "Osaka" and the like is obtained as the activity information. The information included in the activity information is not particularly limited, and for example, information corresponding to the information shown in FIGS. 5A to 5E may be included.

The cloud printing service specifies cloud printers registered under the specified tenant as candidate printers. Furthermore, the cloud printing service narrows down the printer that can serve as a usable candidate printer based on the activity information.

The cloud printing service transmits, to the bot service, a candidate printer list as a response to the inquiry from the bot service. Note that in a case in which a plurality of printers have been discovered, the cloud printing service will notify, as a response, the bot service of a list of printers which have been appropriately prioritized based on the activity information or the like.

The bot service presents a printer on the chat screen based on the candidate printer obtained from the cloud printing service. For example, a candidate can be displayed in the manner shown in FIGS. 6B and 7B. In a case in which similar processing is to be applied to scan processing, the candidate printer can be narrowed down based on whether the printer has a scanning capability. It may be also arranged so that the information of the tenant to which the user belongs will be presented together with the candidate printer. Assume that the inquiries and the responses exchanged between the cloud services are implemented by using an API used for the cooperation of the services provided by the cloud platform. Since the various kinds of processes preformed after the presentation of the printer are similar to those of the above-described embodiment, a description of the processes will be omitted.

Furthermore, although the above-described embodiments exemplified a case in which it is possible to specify a printer that corresponds to the user, exception handling of a case in which it is not possible to specify a printer may be performed as an additional modification. For example, if a dialog for performing printing by a local printer used by the user can be displayed, it may be arranged so this dialog will be displayed in a case in which a printer could not be specified. For example, if information indicating the absence of candidate printers is received from the bot service, the chat app may display a common printing dialog for printing by using the printer driver and recommend printing by the printer driver to the user.

In addition, in a case in which the terminal installed with the chat client for using the chat service is a terminal incorporating an Android® OS, it may be arranged so that local printing using Mopria® print service or the like will be recommended. Furthermore, in a case in which the terminal installed with the chat client for using the chat service is a terminal incorporating a Mac® OS or an iOS, it may be arranged so that local printing using AirPrint® will be recommended.

In addition, if it is determined, as a result of confirming the presence of a usable image forming apparatus, that there is no image forming apparatus associated with the user account, a message prompting the user to register a new image forming apparatus may be displayed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-149921, filed Aug. 19, 2019 which is hereby incorporated by reference herein in its entirety.

What is claimed is:

1. An image processing system that includes a chat application service, a server, and a plurality of image processing apparatuses which are used by a plurality of users, the server comprising:
   at least one memory that stores a set of instructions; and
   at least one processor that executes the instructions, the instructions, when executed, causing the server to perform operations comprising:
   storing user information and information of an image processing apparatus in a predetermined storage area, and
   providing, as a bot of the chat application service, a chat bot function for supporting an operation by a user,
   wherein the supporting of the operation includes, in a case in which an image processing request is accepted via a chat screen of the chat application service, processing to specify, based on the information stored in the predetermined storage area, an image processing apparatus which can be used by a user who made the image processing request from the plurality of image processing apparatuses, and to present information of the specified image processing apparatus via the chat screen.

2. The system according to claim 1, wherein in the processing to specify the image processing apparatus, the image processing apparatus which can be used by the user is specified based on at least one of information of an image processing apparatus associated with a user of the chat application service, position information of the image processing apparatus and the user of the chat application service, and information of an image processing apparatus used by a user of the same chat group of the chat application service.

3. The system according to claim 1, wherein the operations further comprise
   in accordance with accepting, via the chat screen of the chat application service, an instruction to execute image processing using an image processing apparatus, transmitting an instruction related to the execution of the image processing to the image processing apparatus.

4. The system according to claim 3, wherein the supporting of the operation by the bot further includes processing to display, on the chat screen of the chat application service after the instruction to execute the image processing has been accepted, a message indicating that the image processing is being executed.

5. The system according to claim 3, wherein the supporting of the operation by the bot further includes processing to display, on the chat screen of the chat application service, a message indicating that the image processing has been executed in accordance with the completion of the image processing based on the instruction.

6. The system according to claim 1, wherein in a case in which it is specified that a plurality of image processing apparatuses which can be used by the user are present in the processing to present the information of the specified image processing apparatus via the chat screen, the information is presented on the chat screen of the chat application service so that the user will be able to select an image processing apparatus to be used from the plurality of image processing apparatuses which can be used by the user.

7. The system according to claim 1, wherein the bot is activated when a user performs a predetermined operation on the chat screen of the chat application service.

8. The system according to claim 7, wherein the predetermined operation is one of an operation to request printing of a file posted on the chat screen of the chat application service and an operation to request sharing of an image, which has been obtained by scanning an original, on the chat screen.

9. The system according to claim 1, wherein when a file is posted on the chat screen of the chat application service, the supporting of the operation by the bot includes processing to display a button to request printing of the file.

10. The system according to claim 1, wherein information of a tenant of a cloud service and an image processing apparatus on a cloud which can be used by a user belonging to the tenant are associated and stored in the predetermined storage area, and
the processing to specify the image processing apparatus which can be used by the user from the plurality of plurality of image processing apparatuses includes processing to specify, based on the information stored in the predetermined storage area, the tenant to which the user who made the image processing request belongs and to specify, based on information of the specified tenant, the image processing apparatus on the cloud which can be used by the user.

11. A method of presenting, to a user using a chat application service, a printer which can be used by the user, the method comprising:

storing user information and information of an image processing apparatus in a predetermined storage area, and providing, as a bot of the chat application service, a chat bot function for supporting an operation by a user, wherein the supporting of the operation includes, in a case in which an image processing request is accepted via a chat screen of the chat application service, processing to specify, based on the information stored in the predetermined storage area, an image processing apparatus which can be used by a user who made the image processing request from the plurality of image processing apparatuses, and to present information of the specified image processing apparatus via the chat screen.

12. A control method for presenting, to a user using a chat application service which is executed by using a cloud platform including the chat application service, a chat bot, a cloud printing service, and a management service for managing user information, a cloud printer which can be used by the user, wherein in a case in which a chat bot participating in a chat presented by the chat application service accepts, via the chat, a user operation indicating a printing request, the chat bot transmits, to the cloud printing service, a request including information for identifying a user who made the user operation and inquiring about a cloud printer which can be used by the user, in response to accepting the request, the cloud printing service specifies, based on the information for identifying the user included in the request, a tenant of the user who made the printing request to the management service, and notifies the chat bot of a list of the cloud printers which can be used by the user belonging to the specified tenant, and the chat bot further presents, based on the notified list of the cloud printers, a cloud printer which can be used by the user who made the user operation indicating the printing request on the chat.

* * * * *